United States Patent
Goh et al.

(10) Patent No.: US 8,965,146 B2
(45) Date of Patent: Feb. 24, 2015

(54) ADVANCED-FORMAT OPTICAL MODULATOR WITH LOW POWER CONSUMPTION AND LOW-LOSS CHARACTERISTICS

(75) Inventors: Takashi Goh, Atsugi (JP); Yoshiyuki Doi, Atsugi (JP); Shinji Mino, Atsugi (JP); Ken Tsuzuki, Atsugi (JP); Hiroshi Yamazaki, Atsugi (JP); Takashi Yamada, Atsugi (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 13/381,298

(22) PCT Filed: Jul. 9, 2010

(86) PCT No.: PCT/JP2010/004490
§ 371 (c)(1), (2), (4) Date: Dec. 28, 2011

(87) PCT Pub. No.: WO2011/004615
PCT Pub. Date: Jan. 13, 2011

(65) Prior Publication Data
US 2012/0106888 A1    May 3, 2012

(30) Foreign Application Priority Data

Jul. 9, 2010  (JP) .................................. 2009-164081

(51) Int. Cl.
*G02F 1/035*    (2006.01)
*G02F 1/03*    (2006.01)
(Continued)

(52) U.S. Cl.
CPC .............. *G02F 1/0327* (2013.01); *G02F 1/225* (2013.01); *G02B 2006/12142* (2013.01); *G02B 2006/12159* (2013.01); *G02F 2001/126* (2013.01); *G02F 2203/20* (2013.01); *G02F 2203/21* (2013.01)
USPC ...................... 385/3; 359/278; 385/8; 385/45

(58) Field of Classification Search
USPC .............................................. 385/3; 359/278
See application file for complete search history.

(56) References Cited

U.S. PATENT DOCUMENTS 5,022,731 A  *  6/1991   Maerfeld et al. .............. 359/332
5,208,817 A      5/1993   Kao et al.
(Continued)

FOREIGN PATENT DOCUMENTS

CN        1346451       4/2002
CN      101345585       1/2009
(Continued)

OTHER PUBLICATIONS

English translation of International Preliminary Report on Patentability for Application No. PCT/JP2010/004490, filed Jul. 9, 2010, dated Feb. 23, 2012.
(Continued)

*Primary Examiner* — Ellen Kim
(74) *Attorney, Agent, or Firm* — Workman Nydegger

(57) ABSTRACT

In a nest MZI modulator in which each arm includes a child MZI, the power consumption is reduced. The hybrid integrated-type nest MZI modulator of the embodiment 1a is configured so that, instead of placing a relative phase adjusting section in a parent MZI, a bias electrode Bias 90° in which an electric field is applied in the same direction to the polarization direction in both of the upper and lower arms is placed in each child MZI (see FIG. 4B). The bias electrode Bias 90° provided in each child MZI constitute the entirety of a relative phase adjusting section. The optical signals are subjected to a phase change after the output from the child MZI (see FIG. 1A), because such relative phase adjusting section can subject the optical signals of the upper and lower arms of the child MZI to a shift change in the same direction, respectively.

4 Claims, 42 Drawing Sheets

(51) Int. Cl.
  *G02F 1/225* (2006.01)
  *G02B 6/12* (2006.01)

(56) References Cited

U.S. PATENT DOCUMENTS

| | | | |
|---|---|---|---|
| 7,272,271 B2* | 9/2007 | Kaplan et al. | 385/3 |
| 7,715,732 B2* | 5/2010 | Koh et al. | 398/194 |
| 7,840,141 B2* | 11/2010 | Tanaka et al. | 398/198 |
| 7,876,491 B2* | 1/2011 | Ide et al. | 359/279 |
| 2003/0128905 A1* | 7/2003 | Kambe et al. | 385/3 |
| 2004/0028418 A1* | 2/2004 | Kaplan et al. | 398/188 |
| 2008/0031564 A1* | 2/2008 | Sugiyama | 385/9 |
| 2009/0232440 A1 | 9/2009 | Kawanishi et al. | |
| 2010/0215365 A1* | 8/2010 | Fukuchi | 398/43 |

FOREIGN PATENT DOCUMENTS

| | | | | |
|---|---|---|---|---|
| EP | 0374006 A1 | 6/1990 | | |
| EP | 1020754 | 7/2000 | | |
| EP | 1895357 A1 | 3/2008 | | |
| EP | 1923739 A1 * | 5/2008 | | G02F 1/225 |
| EP | 2003486 A1 | 12/2008 | | |
| EP | 2003486 A2 | 12/2008 | | |
| EP | 2006486 A9 | 4/2009 | | |
| JP | 2007-043638 | 2/2007 | | |
| JP | 2007-065240 | 3/2007 | | |
| JP | 2007-094100 | 4/2007 | | |
| JP | 2008-039859 | 2/2008 | | |
| JP | 2008-058436 | 3/2008 | | |
| JP | 2010-286770 | 12/2010 | | |
| WO | WO 2007/116475 | 10/2007 | | |

OTHER PUBLICATIONS

Masaki Sugiyama et al., *Low-Drive-Voltage and Compact RZ-DQPSK LiNbO3 Modulator*, 33$^{rd}$ European Conference and Exhibition on Optical Communication, Sep. 16, 2007, pp. 2.
European Office Action dated Aug. 23, 2012, issued in European Publication No. 2453295, filed on Jul. 9, 2010.
Notice of Allowance dated Dec. 11, 2012, issued in JP 2011-521832.
Takashi Shiraishi, et al., "*Compact LiNbO$_3$ Optical Modulator for Polarization-Division-Multiplexing RZ-DQPSK*", 2009 Nen The Institute of Electronics, Information and Communication Engineers Sogo Taikai Koen Ronbunshu, Electronics 1, Mar. 4, 2009, p. 215. English translation.
P. J. Winzer et al., "*Advanced Modulation Formats for High-Capacity Optical Transport Networks*," Journal of Lightwave Technology, vol. 24, No. 12, pp. 4711-4728, 2006.
Takashi Yamada et al., "*DQPSK Modulator Using Hybrid Assembly Technique With PLC and LN Devices*", Shingakukai, Syunki Sougou Taikai, 2007, C-3-66.
Hiroshi Yamazaki et al., "*Integrated 100-Gb/S PDM-QPSK Modulator Using a Hybrid Configuration of Silica-Based PLCs and LiNbO$_3$ Phase Modulators*", ECOC 2008, Sep. 21-25, 2008 Brussels, Belgium, pp. 17-20.
Takashi Yamada et al., *86-Gbit/s Differential Quadrature Phase-Shift-Keying Modulator Using Hybrid Assembly Technique with Planar Lightwave Circuit and LiNbO$_3$ Devices*, Shingakukai, Syunki Sougou Taikai, 2007, C-3-66.
International Search Report issued Aug. 10, 2010 in Application No. PCT/JP2010/004490, filed Jul. 9, 2010.
Office Action from corresponding Chinese Patent Application No. 201080029876.9, dated Dec. 12, 2013.
Chinese Office Action received in corresponding Application No. CN201080029876.9 dated Jul. 21, 2012.

* cited by examiner

IN AN EMBODIMENT IN WHICH
THE RELATIVE PHASE ADJUSTING
SECTION OF THE PARENT MZI
IS ONLY AT ONE SIDE (Qch-SIDE)
IN AN EMBODIMENT IN WHICH
THE GND IS ALSO PROVIDED AT
THE CENTER ELECTRODE
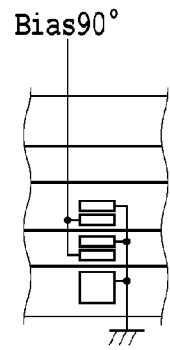
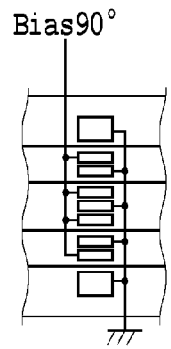
FIG.5A
FIG.5B

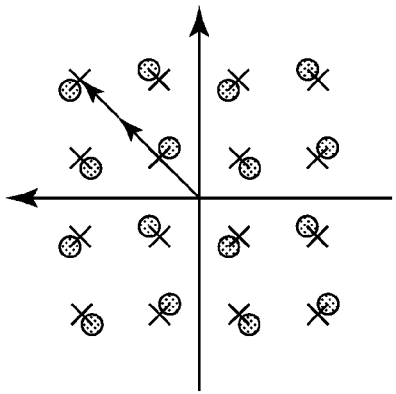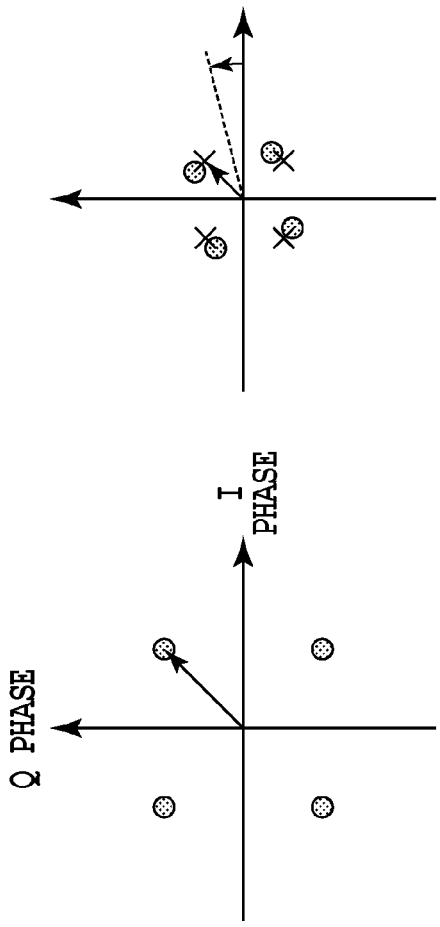
FIG.12A SIGNAL SPACE DIAGRAM OF THE ELECTRIC FIELD OF AN OPTICAL SIGNAL HAVING PASSED THROUGH THE QPSK MODULATOR 1
FIG.12B SIGNAL SPACE DIAGRAM OF THE ELECTRIC FIELD OF AN OPTICAL SIGNAL HAVING PASSED THROUGH THE QPSK MODULATOR 2
FIG.12C SIGNAL SPACE DIAGRAM OF THE ELECTRIC FIELD OF A SYNTHESIS OPTICAL SIGNAL

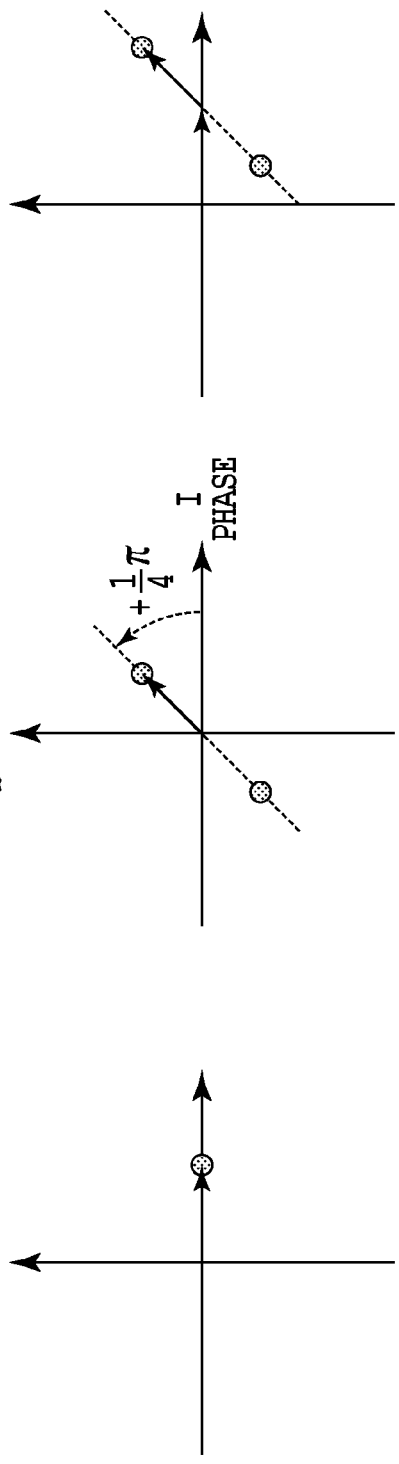

ADVANCED-FORMAT OPTICAL MODULATOR WITH LOW POWER CONSUMPTION AND LOW-LOSS CHARACTERISTICS

TECHNICAL FIELD

The present invention relates to an optical modulator. More particularly, the present invention relates to a nest MZI modulator.

BACKGROUND ART

In an optical fiber communication system, it has been considered to use a multilevel modulation technique and a polarization multiplexing technique in order to increase the transmission rate per one wavelength from 10 Gbps to 40 Gbps or 100 Gbps. The multilevel modulation technique is a technique that uses an optical signal amplitude together with phase information to transmit more many information in one symbol. With regard to 40 Gbps transmission, Differential Quadrature Phase-Shift Keying (DQPSK) modulation has been already used according to which four-state signal can be used to transmit 2-bit information per one symbol. The polarization multiplexing technique is a technique to use polarization to multiplex two types of signals to thereby obtain a doubled transmission rate. In the 100 Gbps-class transmission which is expected to be put to practical use in the future, the polarization multiplexing QPSK modulation method, which is a combination of the above multilevel modulation technique and this polarization multiplexing method, has been considered as one of promising candidates.

These modulation methods are based on a modulator for generating a QPSK modulation signal. This modulator is different from a modulator consisting of a single Mach-Zehnder modulator conventionally used for 10 Gbps transmission for example in that, as shown in FIG. 1A, each arm waveguide section of a large MZI (hereinafter referred to as "parent MZI") has an MZI modulator (hereinafter referred to as "child MZI") to provide a modulator having a slightly-complicated configuration in which the MZIs are provided in a nested structure (hereinafter referred to as "nest MZI modulator") (see Non-patent Publication 1, FIG. 10 for example). Generally, these modulators are prepared by a technique using lithium niobate light waveguide (hereinafter referred to as "LN waveguide") having a high electro-optic effect (EO effect). Each child MZI includes a high-frequency electrode to convert an electric signal to an optical modulation signal (the above high-frequency electrode generally has a traveling wave electrode configuration and a transmission line structure having a fixed impedance is used for the electrode configuration. However, this drawing does not show a signal input section or a signal output section for the purpose of simplicity. The same also applies to the following drawings in principle). Each child MZI has a modulation operating point adjusting section having a bias electrode for adjusting a modulation operating point (which is connected to bias terminals BiasI and BiasQ, respectively. Hereinafter, a bias terminal will be referred to as a bias electrode for the convenience of the description). A parent MZI has a relative phase adjusting section that has a bias electrode Bias90° for adjusting relative phase of the optical signals outputted from the child MZIs (90° phase adjustment). This drawing shows an example in which an X-cut substrate is used that can reduce the number of high-frequency electrodes. The nest MZI modulator using the LN waveguide as described above (monolithic-type nest MZI modulator) is already commercially available and can be obtained widely.

In order to understand the QPSK modulation operation by the nest MZI modulator, the following section will firstly describe the operation of a child MZI (i.e., a single MZI modulator). An X-cut substrate is configured so that the LN polarization direction is in the up-and-down direction in FIG. 1A. The electric field from the high-frequency electrode at the center of the MZI modulator proceeds through an upper arm in the upper direction and proceeds through a lower arm in the lower direction. Thus, this electric field proceeds in an opposite direction to the polarization direction depending on the upper or lower arm waveguide (see FIG. 1B and FIG. 1C). Thus, a refractive index change due to the EO effect is in an opposite direction depending on the upper or lower arm waveguide. Thus, the phase change of light propagating through the waveguide is also in an opposite direction depending on the upper or lower arm waveguide. In the drawings, the electric field is shown so that only the electric field distribution applied to the waveguide is simply shown for the convenience of the drawing. Thus, the electric field distributions of other regions are not shown. This applies to the subsequent drawings.

The continuous wave (CW) light inputted to the MZI modulator is bifurcated by an optical coupler and is subsequently subjected, by the electric signal applied to the high-frequency electrode, to phase changes by the upper and lower arm waveguides that are in opposite directions respectively and that are in the same amount. Then, the bifurcated lights join together through the optical coupler again. Then, the electric field phase of the output signal light changes as shown in FIG. 2A. The light having passed the upper arm is subjected to a phase change in a positive direction. Thus, the electric field vector $E_{MZI(H)}$ draws a trajectory in a counterclockwise direction (X→white circle→black circle). The light having passed the lower arm is subjected to a phase change in a negative direction. Thus, the electric field vector $E_{MZI(L)}$ draws a trajectory in the clockwise direction. The vector synthesis of these electric fields results in the electric field vector $E_{MZI}$ of the output signal light. Thus, the trajectory draws a straight trajectory on the real axis. This can be described by the following formula.

$$E_{MZI(H)} = \frac{1}{2}e^{j\xi}$$
$$E_{MZI(L)} = \frac{1}{2}e^{-j\xi}$$
$$E_{MZI} = E_{MZI(H)} + E_{MZI(L)} = \frac{1}{2}(e^{j\xi} + e^{-j\xi}) = \cos(\xi)$$

Formula 1

In the formula $\xi$ represents a phase change applied by the electric field from the high-frequency electrode. Thus, when the MZI modulator of the X-cut substrate is driven (2Vπ-driven) as shown in FIG. 2B so that the phase difference between the arm waveguides has a 2π change, the output light is phase-modulated to zero phase and π, and functions as a phase binary phase modulator (PSK modulator) that has a constant signal light intensity at a signal timing. The output light also functions as a binary phase modulator when the upper arm and the lower arm in the LN of a Z-cut substrate are subjected to a push-pull driving for subjecting these arms to phase changes of the same amount and in opposite directions.

In the nest MZI modulator, binary phase modulation signal lights outputted from an Ich child MZI and a Qch child MZI are synthesized to have a 90° phase difference by having a quarter wavelength as a difference in the optical path length between the Ich-side and the Qch-side, thus providing QPSK signal light as shown in FIG. 2C modulated to have a quadriphase. As described above, the nest MZI modulator can be allowed to operate as a QPSK modulator. Furthermore, Ich/Qch can have an arbitrary amplitude by setting the electric signal amplitude not only to a binary value but also to multiple values. Thus, a signal point at an arbitrary position on the electric field phase plane can be subjected to vector synthesis. Thus, this modulator is also called a vector modulator.

When the LN waveguide is subjected to a voltage for a long time, charge up for example causes a change in the refractive index of the waveguide, thus causing a phenomenon called a DC drift of interference condition shifts. A phenomenon called a temperature drift of a change in the refractive index is also caused depending on an environment temperature. The interference condition shifts as described above causes, in the child MZI, an error of a modulation operation point and causes, in the parent MZI, an error of an orthogonality in the relative phase of the Ich/Qch optical signal (i.e., error from the phase difference of 90°). These errors both cause a degradation of optical signal quality and are not preferred. Thus, the error amount must be sensed by an appropriate monitor means and must be compensated with adjustment.

The compensation of the error of the modulation operating point of the child MZI has been carried out, in the case of a modulator of an initial stage, by inserting, to a high-frequency input preceding stage, an electric circuit for synthesizing a high-frequency signal component called a bias tee and a DC bias component to superimpose a bias voltage on a modulation signal for compensation. However, the use of a bias tee causes a disadvantage where the low-frequency characteristic to an electric signal is substantially deteriorated. To prevent this, bias tees are not used in recent years and, as shown in FIG. 1A, exclusive bias electrodes BiasI and BiasQ for adjusting a modulation operating point to compensation/adjustment are frequently provided separate from a high-frequency electrode to apply a bias voltage.

In contrast with a high-frequency electrode, the bias electrode does not use a high frequency. Thus, the bias electrode does not use a distributed-constant design as in the traveling wave electrode and uses a simple lumped-constant design instead. However, the bias electrode applies an electric field to a waveguide that is basically in the same direction as that by the high-frequency electrode. Thus, the high-frequency electrode and the bias electrode have the same action from the viewpoint of direct current.

The 90° phase adjustment in the parent MZI is performed, as shown in FIG. 1A, by the bias electrode Bias90° provided in the parent MZI to adjust the relative phase of the Ich/Qch optical signal.

Next, the following section will describe a hybrid integrated-type nest MZI modulator obtained by combining a silica-based planar lightwave circuit (PLC) with an LN modulation array (see Non-patent Publication 2, FIG. 1 for example). This hybrid integrated nest MZI modulator is composed, as shown in FIG. 3A, of the connection of different waveguides of a PLC waveguide and an LN waveguide. The input-side three branch circuits and the output-side three confluence circuits are configured by a PLC waveguide. A modulation array section including a high-frequency electrode for converting an electric signal to a light modulation signal is configured by an LN waveguide.

Since the PLC waveguide has a very small EO effect, a single PLC waveguide cannot constitute a modulator. However, the PLC waveguide is a guided-wave medium having a very small loss for which the propagation loss is equal to or lower than one-tenth of that of the LN waveguide. At the same time, the allowable bending radius of the curved waveguide is about 2 mm and has a high design frexibility. Thus, a passive circuit can be used to realize various light circuits having a small loss. On the other hand, the LN waveguide has a propagation loss and an allowable bending radius larger than those of the PLC waveguide and thus is not suitable to constitute a complicated light circuit. However, since the LN waveguide has a high EO effect as described above, the LN waveguide is superior as a high-speed modulation circuit.

Thus, in the case of a complicated modulator such as a nest MZI modulator in particular, as shown in FIG. 3A, a passive circuit part such as a branch/confluence circuit uses a PLC waveguide and only a modulation array section uses an LN waveguide so that the former and the later have a hybrid integrated configuration. Thus, advantages of both of the PLC waveguide and the LN waveguide can be obtained. Thus, such a modulator can be realized that has a smaller loss and a better characteristic than those of a monolithic-type nest MZI modulator using an LN waveguide. This advantage is more remarkable with the increase of the complexity of the configuration of the modulator. This advantage is further remarkable in the case of a polarization multiplexing QPSK modulator requiring not only a branch/confluence circuit but also a polarization beam combiner for example (see Non-patent Publication 3, FIG. 1 for example).

The hybrid integrated-type nest MZI modulator operates basically in the same manner as in the above-described LN waveguide monolithic-type modulator. However, since the relative phase adjusting section is provided on the PLC, the 90° phase adjustment is carried out by a thermooptical (TO) phase shifter. The TO phase shifter uses a thin film heater formed in the clad surface on the waveguide to locally control the waveguide temperature to thereby control, via the TO effect, the waveguide refractive index (i.e., the phase of the guided light). Since the TO phase shifter uses heat, the response speed is on the order of millisecond. However, the above-described respective drifts occur very slowly. Thus, this speed is a sufficient speed to perform the bias adjustment such as the 90° phase adjustment. Although the adjustment of the modulation operating point of the child MZI may be similarly performed by providing a TO phase shifter on a PLC, the configuration of FIG. 3A uses a bias tee as described above so that a high-frequency electrode also can function as a bias electrode.

CITATION LIST

Non-Patent Literature

NPTL 1: P. J. Winzer et al., "Advanced modulation formats for high-capacity optical transport networks, "Journal of Lightwave Technology, vol. 24, no. 12, pp. 4711-4728, 2006

Non-patent Publication 2: Yamada Takashi et al., "DQPSK modulator using hybrid assembly technique with PLC and LN devices", Shingakukai, 2007, Syunki Sougou Taikai, C-3-66

Non-patent Publication 3: Yamazaki Hiroshi et al., "Integrated 100-Gb/s PDM-QPSK modulator using a hybrid configuration of silica-based PLCs and LiNbO3 phase modulators", Shingakukai, 2009, Syunki Sougou Taikai, C-3-62

SUMMARY OF INVENTION

However, the hybrid integrated-type nest MZI modulator had the disadvantage as shown below due to the use of the TO phase shifter.

In the case of the monolithic-type nest MZI modulator using the LN waveguide, the bias adjustment is performed by the phase shifter (EO phase shifter) using the EO effect as described above. Thus, the phase change of the guided light changes in proportion with the voltage, thus providing a phase control in both of the positive and negative directions. Since substantially no current flows and no power is consumed, a driving circuit having a small output power can be used. Thus, a voltage output driving circuit is generally used and a small power is consumed in a driving circuit.

On the other hand, in the case of the bias adjustment by the TO phase shifter, the phase change of the guided light changes in proportion to the heat generation amount (i.e., the power in the TO phase shifter) and only the phase control to the positive side is possible. In order to carry out the phase control to the negative side, the TO phase shifter of the opposite-side arm waveguide is driven to thereby provide a relative control. Thus, an operation is required to switch the phase shifter according to positive or negative shift. Since the phase control is performed by electric power, such a driving circuit is required that can output a relatively-high output power. Thus, a current output driving circuit is generally used, thus increasing the power consumption in the driving circuit.

As described above, in the hybrid integrated-type nest MZI modulator, a disadvantage was caused where high power consumption required for the bias adjustment was increased for both of a TO phase shifter as a relative phase adjusting section and a driving circuit as a relative phase adjusting section.

Furthermore, since the EO phase shifter and the TO phase shifter have significantly-different requirements to the driving circuit, general bias driving circuit and control circuit for the monolithic-type nest MZI modulator using the LN waveguide were frequently suppressed from being directly used for the hybrid integrated-type nest MZI modulator. Thus, when a user who has conventionally used a monolithic-type nest MZI modulator using a general LN waveguide uses a new hybrid integrated-type nest MZI modulator, the user had to newly prepare an exclusive bias control circuit. Specifically, with regard to the bias control/driving circuit, the improvement of the compatibility with an existing monolithic-type nest MZI modulator also has been desired.

The present invention has been made in view of the disadvantage as described above. The first objective is to reduce, in a nest MZI modulator in which each arm includes a child MZI, the power consumption in both of a relative phase adjusting section itself for adjusting the relative phase of an optical signal from the child MZI and a driving circuit of the relative phase adjusting section.

The second objective of the present invention is to provide a single MZI modulator for constituting a child MZI of a nest MZI modulator. When the MZI modulator constitutes the nest MZI modulator, the power consumption of both of a relative phase adjusting section itself provided in the nest MZI modulator and a driving circuit of a relative phase adjusting section can be reduced.

In the above-described description, as a "nest MZI modulator", an optical modulator as shown in FIG. 1 was assumed in which each arm of a parent MZI includes a child MZI. However, the disadvantage regarding the relative phase adjusting section also exists in the optical modulator in which an optical modulator is nested in only one arm of the parent MZI. Thus, the term "nest MZI modulator" used herein also includes an optical modulator a child MZI is nested in only one arm of the parent MZI.

In order to achieve the objective as described above, the first embodiment of the present invention provides an MZI-type optical modulator using a phase shifter configured by material having an electro-optic effect in which both arms of the optical modulator can be subjected to a phase change in the same direction.

The second embodiment of the present invention provides an MZI-type optical modulator having first and second arm waveguides formed in a substrate configured by material having an electro-optic effect in which first and second combinations of electrodes are provided in the vicinity of the first and second arm waveguides. An electric field between the first combination of electrodes and the second of electrodes subjects both of optical signals propagating through the first and second arm waveguides to a phase change in the same direction.

According to the third embodiment of the present invention, in the first or second embodiment, the material having an electro-optic effect is multicomponent oxide material.

According to the fourth embodiment of the present invention, in the second embodiment, a polarization direction in which the electro-optic effect is caused is a vertical direction to the propagation direction of the optical signal and in an in-plane direction of the substrate.

According to the fifth embodiment of the present invention, in the first or second embodiment, a passive circuit part of the optical modulator is formed in a substrate configured by dielectric material.

According to the sixth embodiment of the present invention, in the fifth embodiment, the dielectric material is silica based glass.

According to the seventh embodiment of the present invention, in the second embodiment, the first and second arm waveguides have, at a part including the first and second combinations of electrodes, a pitch conversion section for increasing the pitch between the first arm waveguide and the second waveguide.

According to the eighth embodiment of the present invention, in an optical modulator including at least two or more parallely-connected MZI-type optical modulators, at least one of the parallely-connected MZI-type optical modulators is the optical modulator of the first embodiment.

According to the ninth embodiment of the present invention, in an optical modulator in which each arm waveguide section of a parent MZI includes first and second child MZIs, at least one of the first and second child MZIs is the optical modulator of the second embodiment.

According to the present invention, a child MZI includes a phase shifter that can subject the optical signal of the upper and lower arms of the child MZI to a phase change in the same direction, respectively. This allows, without requiring a parent MZI to have thereon a phase shifter as a phase adjusting section, this bias electrode to be used to thereby adjust the relative phase of the output light from the child MZI.

Therefore, even in a hybrid integrated-type modulator, any bias adjustment can be provided only by the bias electrode provided in the modulation array section (i.e., only by the EO phase shifter without using a TO phase shifter). Thus, such a hybrid integrated-type modulator can be provided that provides reduced power consumption by the phase shifter body and the driving circuit of the phase shifter.

In the bias control, dithering may be used as one of the control methods to superimpose a minute high-frequency signal on a bias signal. In this case, the control speed is limited to the dithering frequency and is approximately limited to an inverse number of the dithering frequency even when optimization is performed. The TO phase shifter generally has a response speed on the order of millisecond. The EO phase shifter on the other hand has a response speed on the order of nanosecond even in the case of a lumped-constant electrode. Thus, the bias electrode of the present invention also can provide a high-speed bias control because the bias electrode of the present invention can handle a dithering signal of a few hundred MHz.

Furthermore, since the bias adjustment can be achieved only by the EO phase shifter, the design specification of the driving circuit for a voltage control can be directly used. Furthermore, an attempt to use a combination of electrodes as described later can provide the direct use of a bias control circuit used in an existing LN waveguide monolithic-type modulator.

Furthermore, since there is no need to use the TO phase shifter, there is no need to form a thin film heater for example on the PLC. This provides an additional effect of reduced chip cost of the PLC. Furthermore, since the PLC includes no heat-generating section, another effect of eliminating the conventional need for a heat dissipation design/heat dissipation mechanism is obtained.

BRIEF DESCRIPTION OF DRAWINGS

FIG. 5A illustrates the layout example of a bias electrode Bias90° for 90° phase adjustment.

FIG. 5B illustrates the layout example of a bias electrode Bias90° for 90° phase adjustment.

FIG. 12A is a signal space diagram of the electric field of an optical signal to the QAM modulator of FIG. 11.

FIG. 12B is a signal space diagram of the electric field of an optical signal to the QAM modulator of FIG. 11.

FIG. 12C is a signal space diagram of the electric field of an optical signal to the QAM modulator of FIG. 11.

FIG. 15A is a signal space diagram of the electric field of an optical signal to the APSK modulator of FIG. 14.

FIG. 15B is a signal space diagram of the electric field of an optical signal to the APSK modulator of FIG. 14.

FIG. 15C is a signal space diagram of the electric field of an optical signal to the APSK modulator of FIG. 14.

DESCRIPTION OF EMBODIMENTS

The following section will describe an embodiment of the present invention with reference to the drawings.

First Embodiment

Figure 4A:
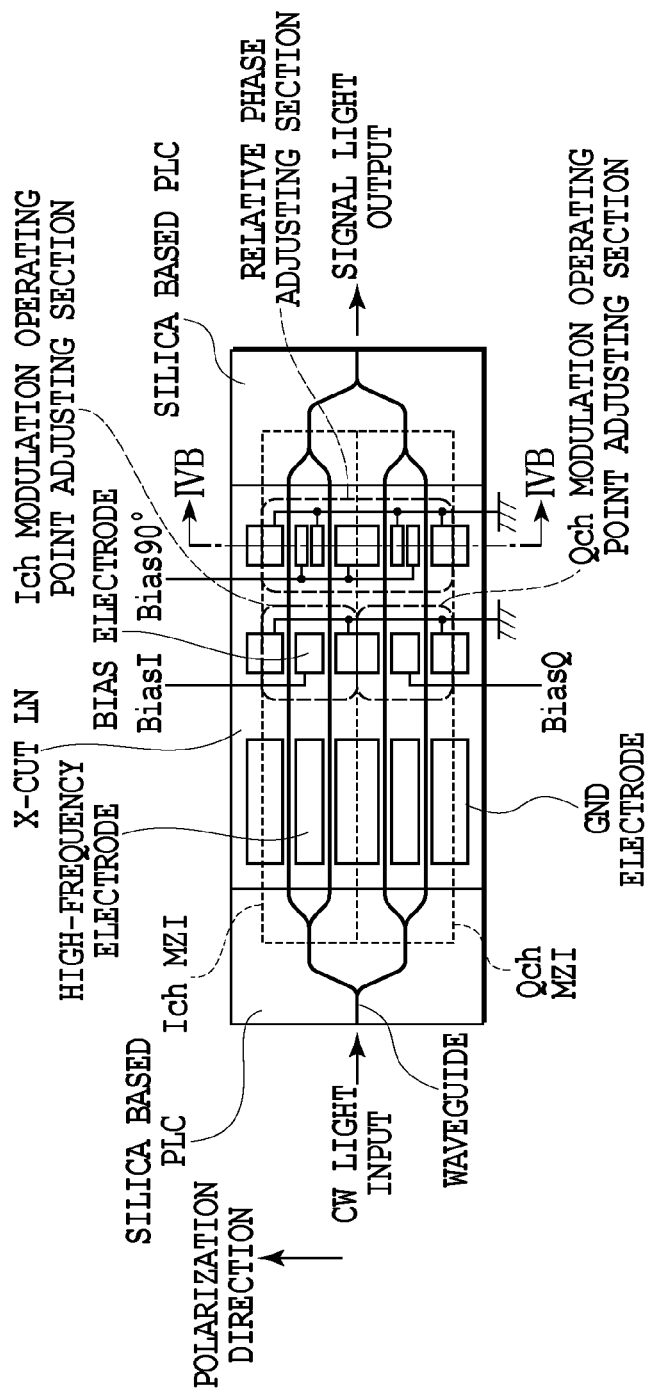
FIG. 4A is a top view illustrating the configuration of a hybrid integrated-type nest MZI modulator as the first embodiment (embodiment 1a) of the invention of this application.
Figure 4B:
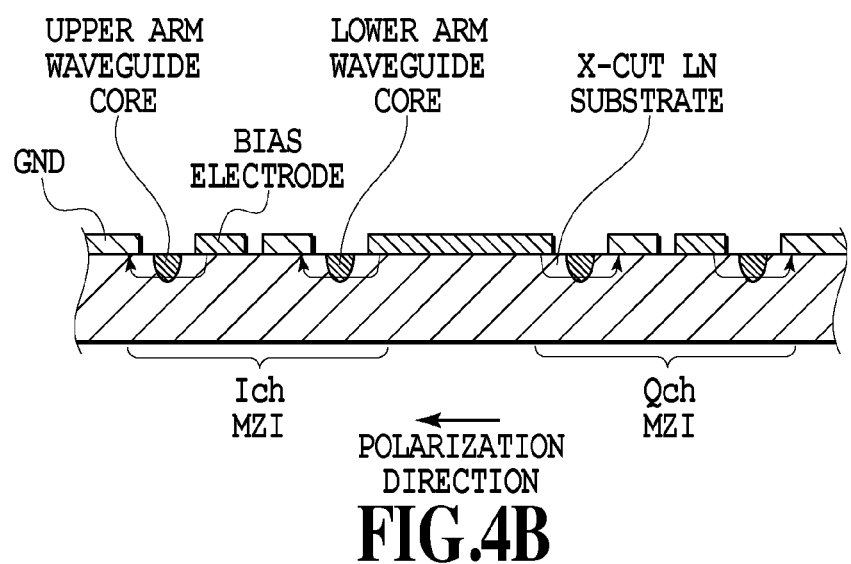
FIG. 4B is a cross-sectional view taken along the line IVB-IVB of FIG. 4A.

FIG. 4A illustrates the configuration of a hybrid integrated-type nest MZI modulator that is the first embodiment (embodiment 1a) of the invention of this application. The modulator configuration of this embodiment generally has the same configuration as the conventional one but is different in the relative phase adjusting section that adjusts the relative phase of an optical signal from a child MZI. Instead of providing a relative phase adjusting section in a parent MZI, each child MZI is allowed to include a bias electrode Bias90° (which corresponds to "first electrode") in which both of the upper and lower arms receive an electric field in the same direction as the polarization direction (or an opposite direction) and a GND electrode (which corresponds to "second electrode") (see FIG. 4B). The bias electrode Bias90° and the GND electrode provided in each child MZI constitute the entire relative phase adjusting section. The relative phase adjusting section as described above can provide, to the optical signals of the upper and lower arm waveguides of the child MZI, phase changes in the same direction, respectively. In other words, the optical signals are subjected to a phase change after the output from the child MZI (see FIG. 1A).

This will be described in details via an example of the Ich-side. When assuming that the input of the child MZI is 1, the upper arm output electric field $E_H$ and the lower arm output electric field $E_L$ can be represented by the following formulae.

$$E_H = \frac{1}{\sqrt{2}} e^{j(\xi+\phi)}$$

$$E_L = \frac{1}{\sqrt{2}} e^{j(-\xi+\phi)}$$

Formula 2

In the formulae, $\xi$ represents a phase change applied by the electric field from the high-frequency electrode and $\phi$ represents a phase change applied by the electric field from the bias electrode Bias90°. For simplicity, the phase change applied by the electric field from the bias electrode BiasI for the adjustment of the modulation operating point is omitted. Thus, the output electric field E of the child MZI can be represented by the following formula.

$$E = \frac{1}{\sqrt{2}} E_H + \frac{1}{\sqrt{2}} E_L$$

$$E_L = \frac{1}{\sqrt{2}} (e^{j\xi} + e^{-j\xi}) e^{j\phi} = \cos(\xi) \cdot e^{j\phi}$$

Formula 3

Figure 1A:
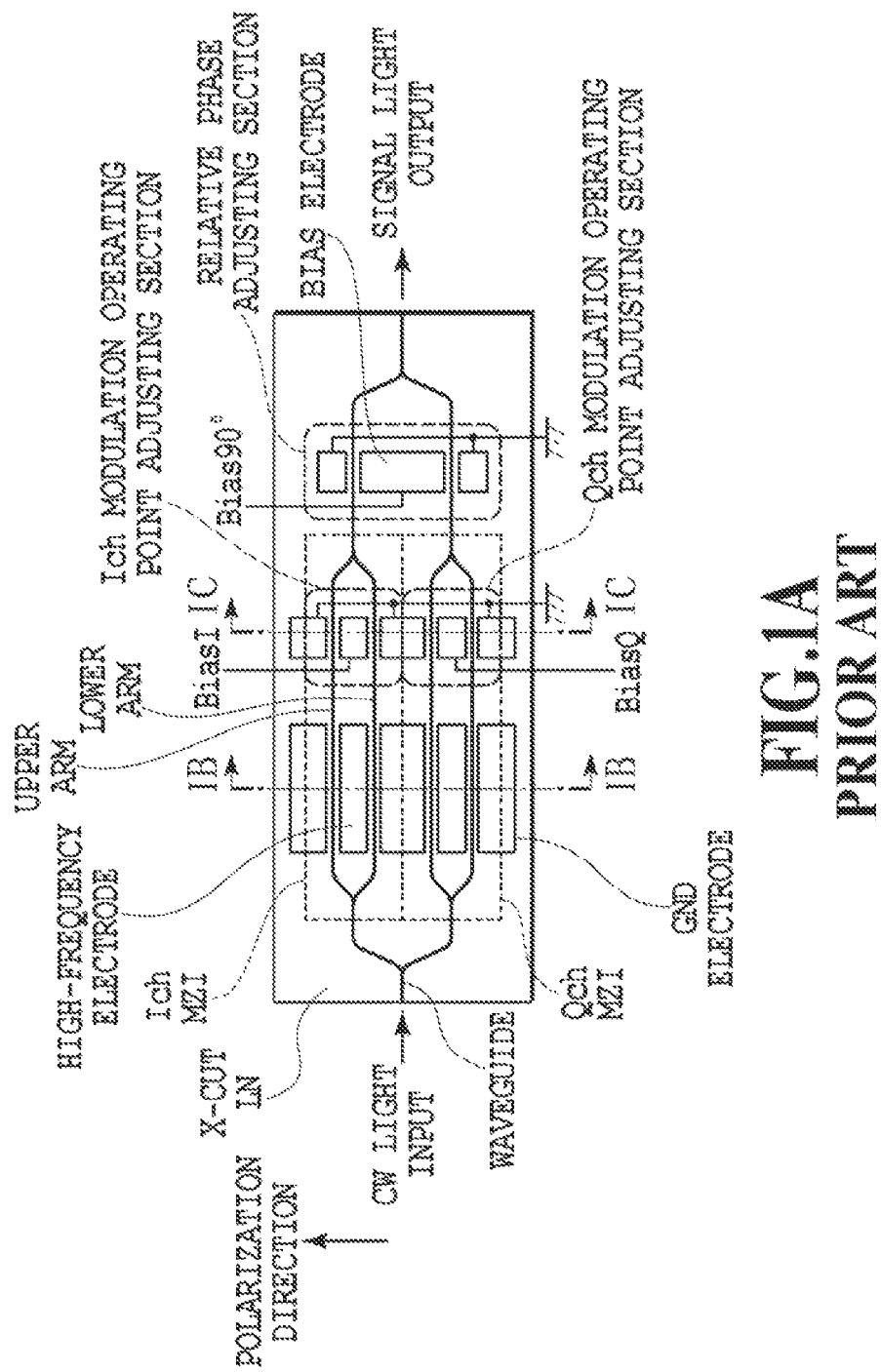
FIG. 1A is a top view illustrating a conventional monolithic-type nest MZI modulator.
Figure 1B:
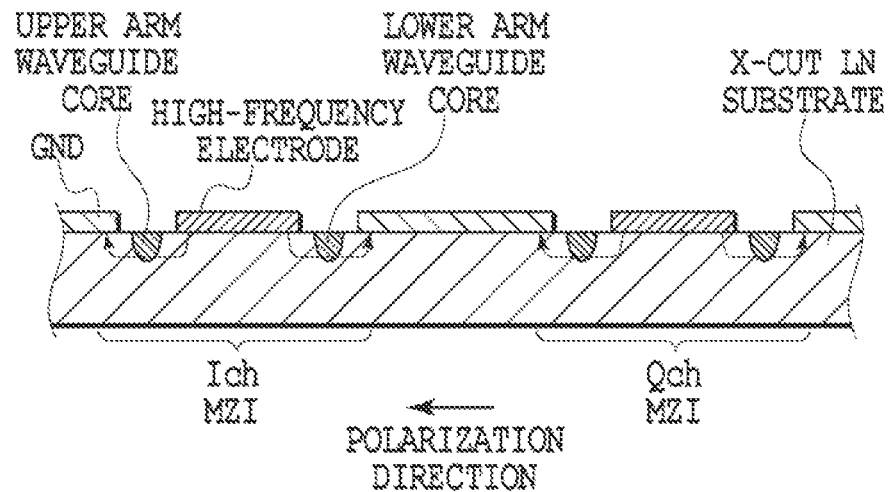
FIG. 1B is a cross-sectional view taken along the line IB-IB of FIG. 1A.
Figure 1C:
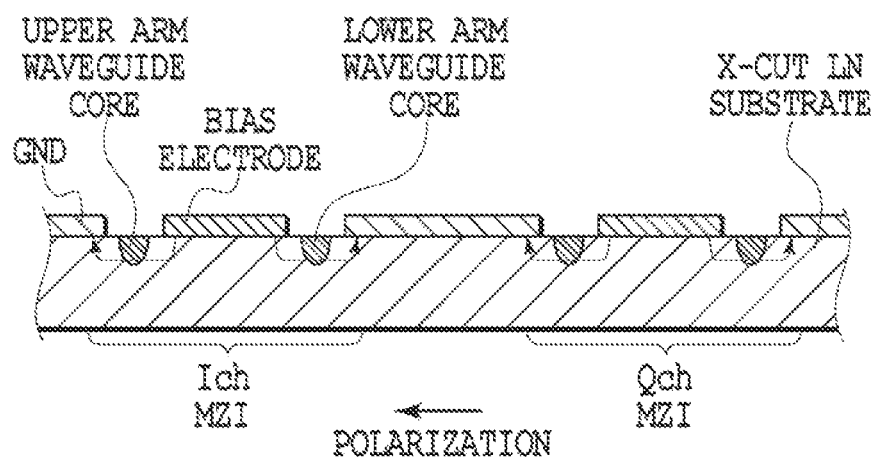
FIG. 1C is a cross-sectional view taken along the line IC-IC of FIG. 1A.
Figure 2B:
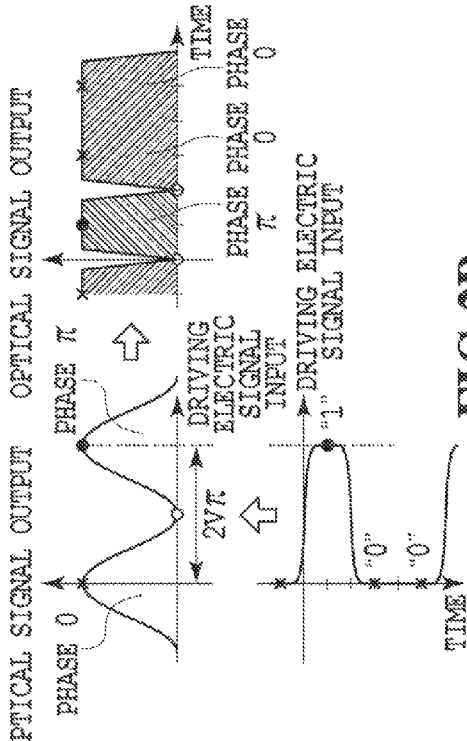
FIG. 2B illustrates the PSK modulation operation of the single MZI modulator.
Figure 2A:
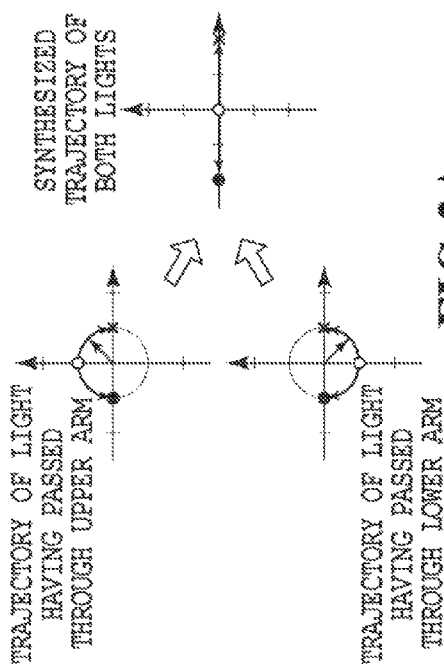
FIG. 2A is a signal space diagram of the electric field of the single MZI modulator output.
Figure 2C:
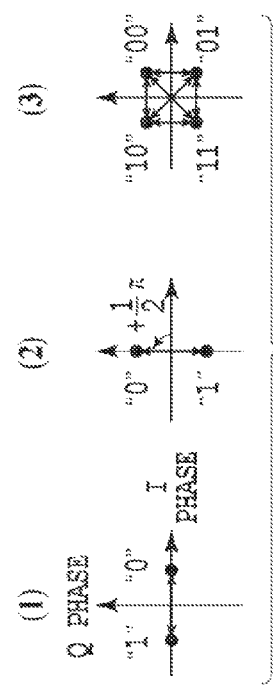
FIG. 2C is a signal space diagram of the electric field of the output of the nest MZI modulator during a QPSK modulation operation.
Figure 3A:
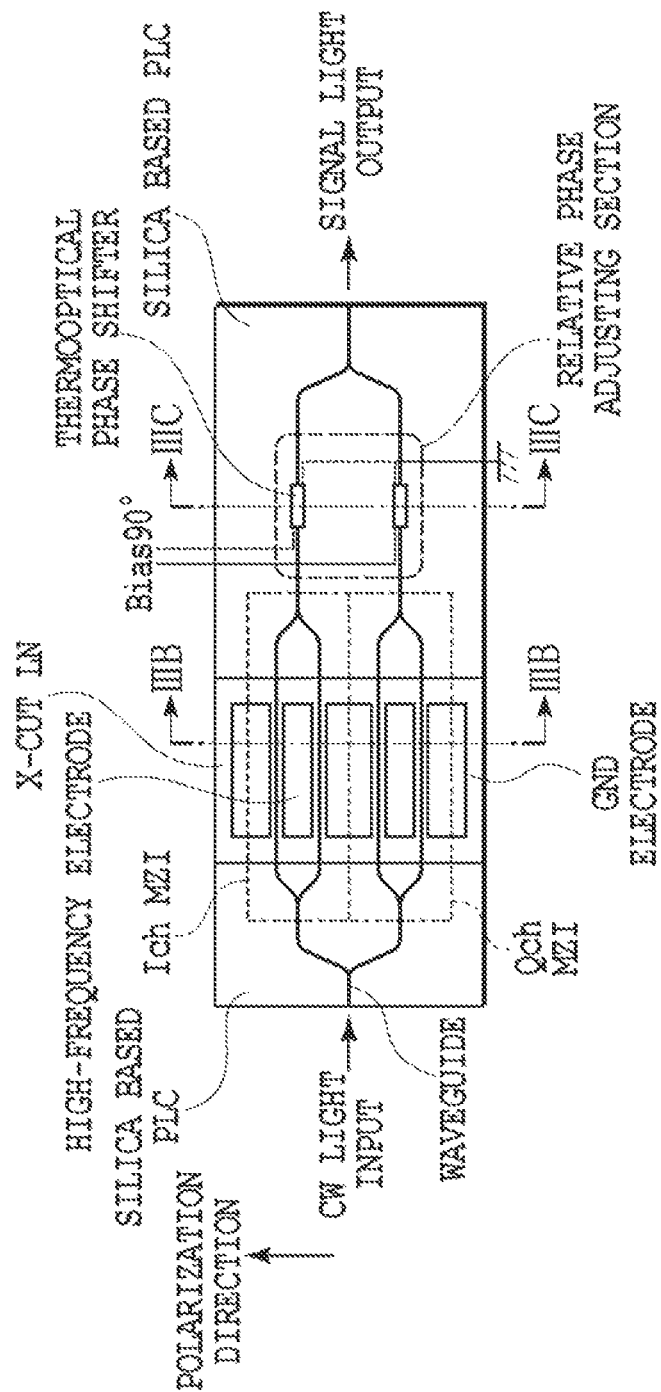
FIG. 3A is a top view illustrating a conventional hybrid integrated-type nest MZI modulator.
Figure 3B:
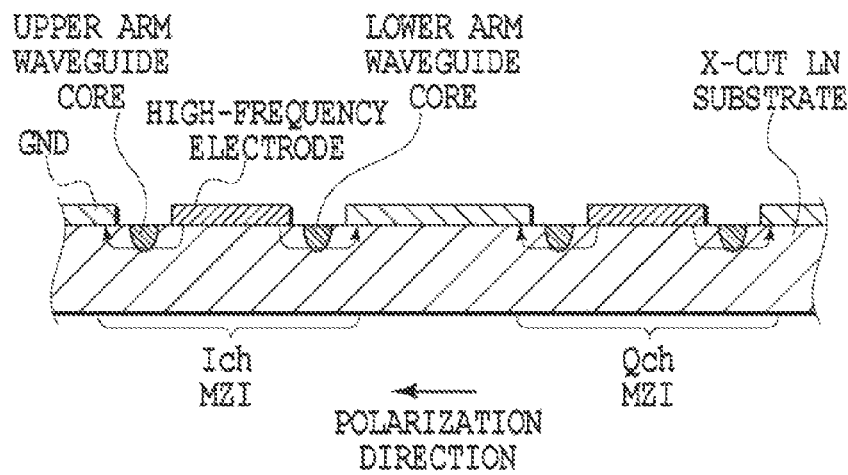
FIG. 3B is a cross-sectional view taken along the line IIIB-IIIB of FIG. 3A.
Figure 3C:
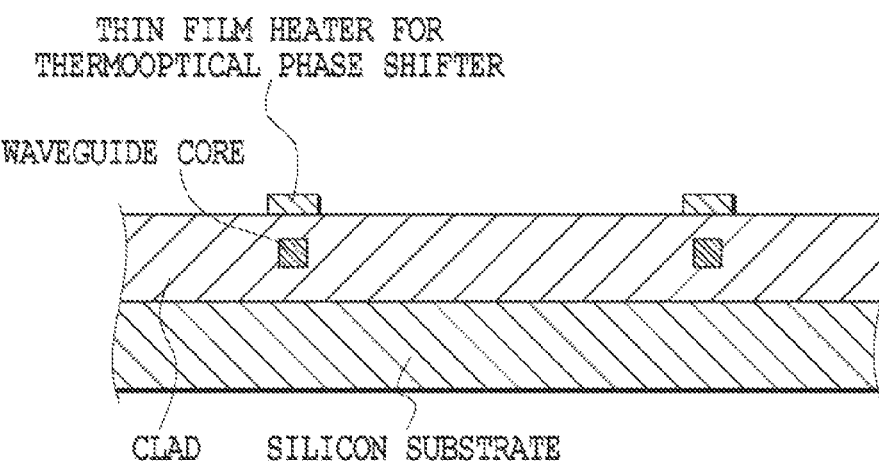
FIG. 3C is a cross-sectional view taken along the line IIIC-IIIC of FIG. 3A.

Thus, the phase change by the bias electrode of this configuration is completely the same as the phase change by the bias electrode of the monolithic-type nest MZI modulator having the conventional configuration shown in FIG. 1A. The same applies to the Qch-side. In the Qch-side, the electric field from the bias electrode Bias90° is applied in an opposite direction to the polarization direction in the case of the Ich-side. Thus, the phase change has an opposite direction of $-\phi$.

As is clear from the above, this configuration can provide, while using the hybrid integrated-type one, the bias adjustment only by the EO phase shifter without using a TO phase shifter. Furthermore, when seeing from the bias control circuit-side, the type and the number of bias terminals as well as the bias adjustment method are completely the same as those of the monolithic-type modulator having the conventional configuration shown in FIG. 1A. Thus, a commercially-available bias control circuit used in a monolithic-type modulator can be directly used.

In this configuration, the bias electrode Bias90° for 90° phase adjustment of the parent MZI is provided at both of the Ich-side child MZI and the Qch-side child MZI. Thus, the relative phase of the Ich/Qch optical signals of the parent MZI is adjusted by the bias electrode Bias90° in an amount of 2φ. Although the bias electrode Bias90° for 90° phase adjustment of the parent MZI also can be provided at only one child MZI as shown in FIG. 5A, the phase adjustment is provided only by one child MZI in this case. Thus, when the same voltage is applied to the bias electrode Bias90°, the change amount of the relative phase is φ, which is a half of 2φ. The embodiment described below will be described mainly based on an example where the bias electrode Bias90° for 90° phase adjustment of the parent MZI is provided at both of the Ich-side and the Qch-side. However, the bias electrode Bias90° for 90° phase adjustment of the parent MZI also can be provided only at one side.

Furthermore, even in a configuration where the convenience for the process of an electrode pattern causes the center electrode to be divided to two parts to sandwich a GND electrode as shown in FIG. 5B, there is no change in the direction along which an electric field is applied to the waveguide. Thus, there is no change in the above-described effect. Specifically, even when there is a change in the pattern as described above, no change is caused in the substantial configuration of the present invention.

Furthermore, the modulation operating point adjusting section of each child MZI may be omitted by a configuration where a bias tee is used so that a bias electrode also can function as a high-frequency electrode. However, this causes the deteriorated modulation characteristic of a low-frequency range as described above. Thus, the modulation operating point adjusting section is desirably provided as in this configuration.

Figure 4C:
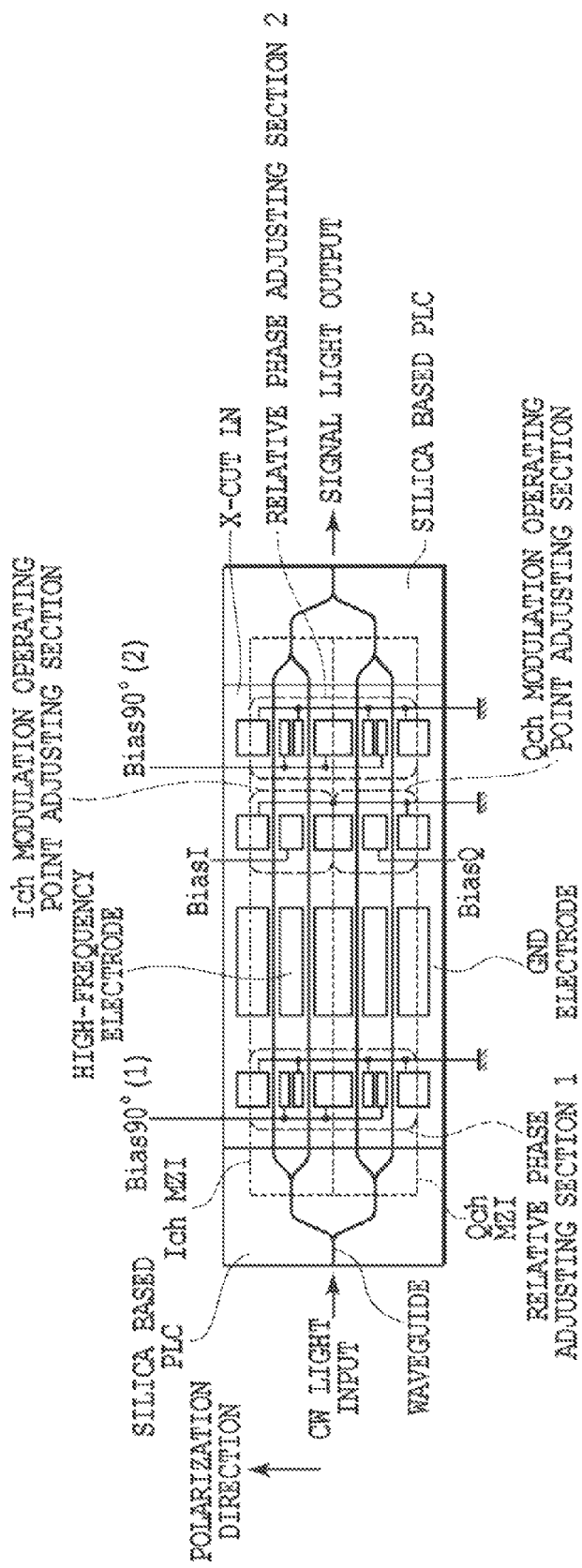
FIG. 4C is a top view illustrating the configuration of a hybrid integrated-type nest MZI modulator according to another embodiment.

Furthermore, no change is caused in the operation even when a different order is caused among the high-frequency electrode, the modulation operating point adjusting section, and the relative phase adjusting section when seen from the light-proceeding direction. Furthermore, the modulation operating point adjusting section or the relative phase adjusting section also may be divided as required. For example, the relative phase adjusting section may be divided to two parts so that, when seen from the light-propagating direction, the relative phase adjusting section 1, the high-frequency electrode, the modulation operating point adjusting section, and the relative phase adjusting section 2 may be arranged in this order, as shown in FIG. 4C.

Figure 6A:
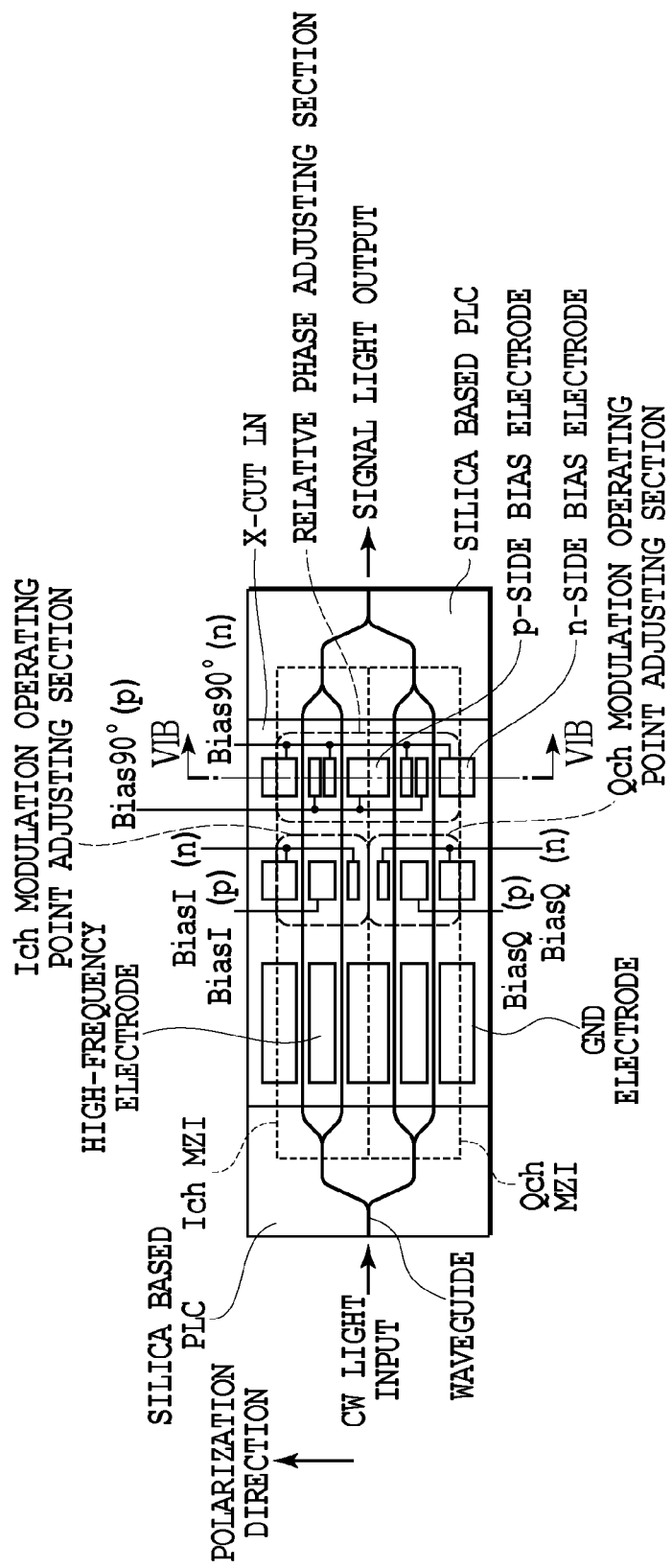
FIG. 6A illustrates the configuration of a hybrid integrated-type nest MZI modulator that is a modification of the first embodiment of the invention of this application (embodiment 1b).
Figure 6B:
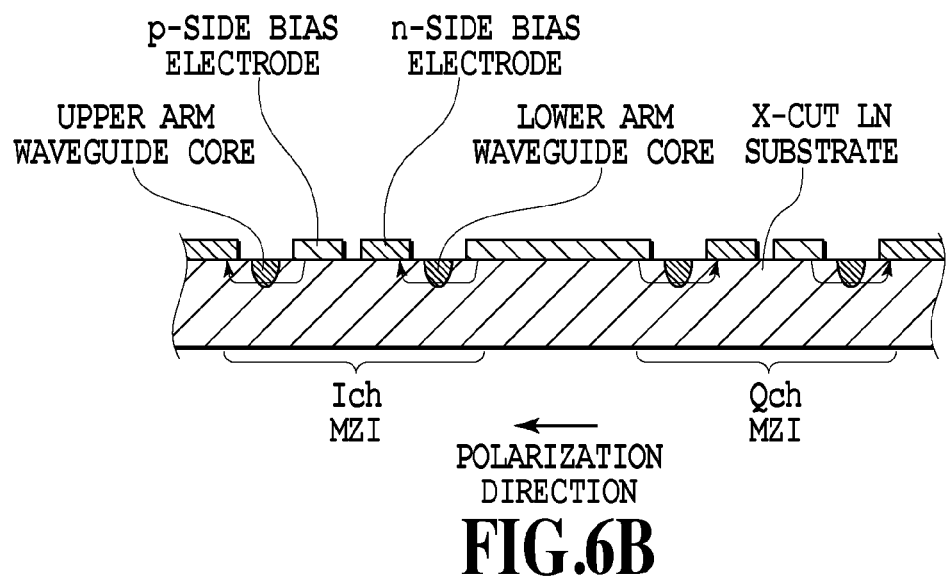
FIG. 6B is a cross-sectional view taken along the line VIB-VIB of FIG. 6A.

FIG. 6A illustrates the configuration of the hybrid integrated-type nest MZI modulator that is a modification of the first embodiment of the invention of this application (embodiment 1b). The configuration of this embodiment is different from that of the embodiment 1a in that the bias electrode has a differential input configuration but is the same as that of the embodiment 1a in that the 90° phase adjustment of the parent MZI is provided by the bias electrode Bias90° for applying an electric field in the same direction to the polarization direction in both of the upper and lower arms in the child MZI.

In this configuration, an electrode set as the ground common electrode GND in the embodiment 1a is set as a bias electrode that can be driven in an independent manner. Thus, in each electrode having a combination of p and n, a differential input is performed to apply a positive or negative voltage to the p-side and a voltage for which the positive or negative sign of the voltage applied to the p-side is inverted. Thus, the voltage applied between both of the electrodes can be doubled. Thus, the phase adjustment capacity can be doubled when compared with that of the embodiment 1a.

Another configuration also may be used in which each combination of the p-side and the n-side of the electrode is set so that only the p-side or the n-side is driven and the other is connected to GND. In this case, the same phase adjustment capacity as that of the embodiment 1a is obtained.

In this embodiment, as a combination of the hybrid integration, a combination of an LN waveguide and a silica based PLC waveguide is described. The reason is that the LN waveguide has a high EO effect and is a major waveguide technique for a high-speed modulator and the silica based waveguide is a waveguide having the lowest loss among passive waveguides. Thus, this combination is superior as a combination for realizing a complicated modulator having a small loss. However, a waveguide having other materials (e.g., a waveguide system having an EO effect) also may be provided by a combination of a waveguide using a multicomponent oxide material or a semiconductor material for example and a waveguide as a passive waveguide using silicon or polymer material to provide the effect shown in this embodiment. The same applies to the following embodiment.

Furthermore, the modulator configuration of the present invention is basically a configuration using a waveguide. The reason is that a practical modulator used in the field of the communication devices is mainly the waveguide-type one. However, the present invention is not limited to this. For example, the invention also can be applied to a modulator having a spatial optical system such as a lens or a mirror.

ILLUSTRATIVE EMBODIMENT

Figure 23:
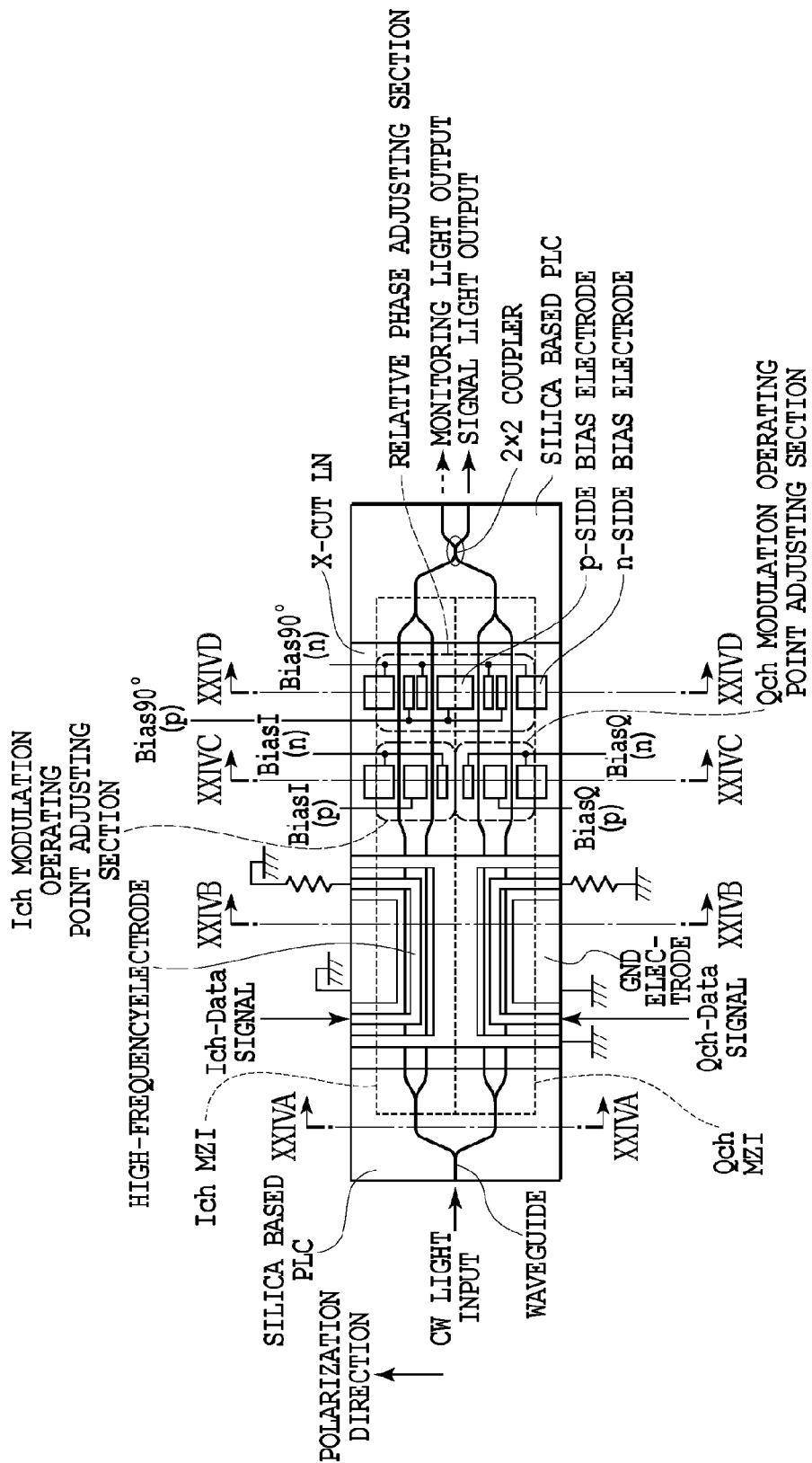
FIG. 23 illustrates the configuration of a nest MZI modulator prepared as an illustrative embodiment of the modification (embodiment 1b) of the first embodiment.
Figure 24A:
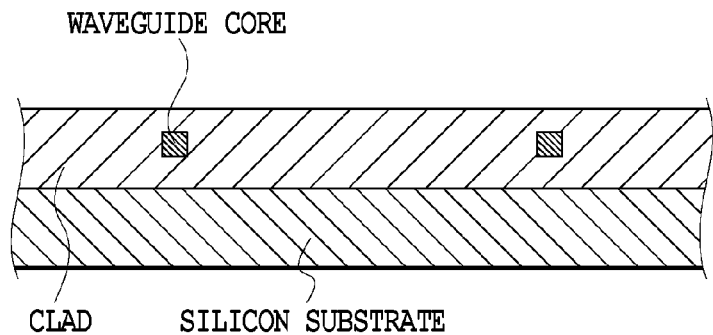
FIG. 24A is a cross-sectional view taken along the line XXIVA-XXIVA of FIG. 23.
Figure 24B:
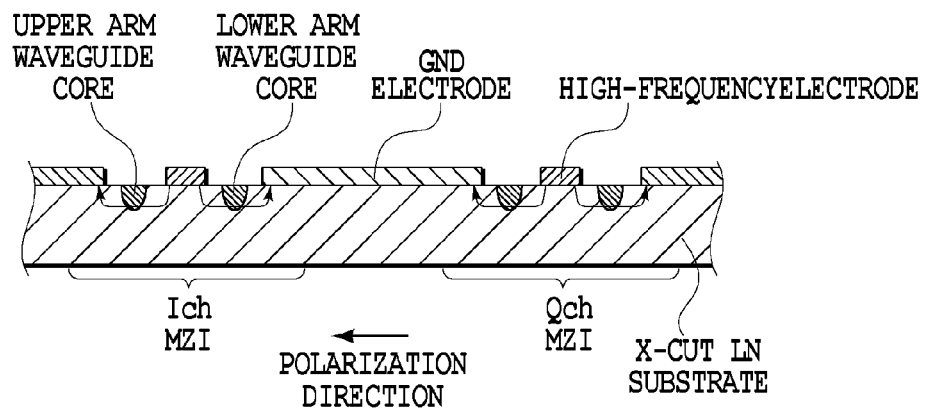
FIG. 24B is a cross-sectional view taken along the line XXIVB-XXIVB of FIG. 23.
Figure 24C:
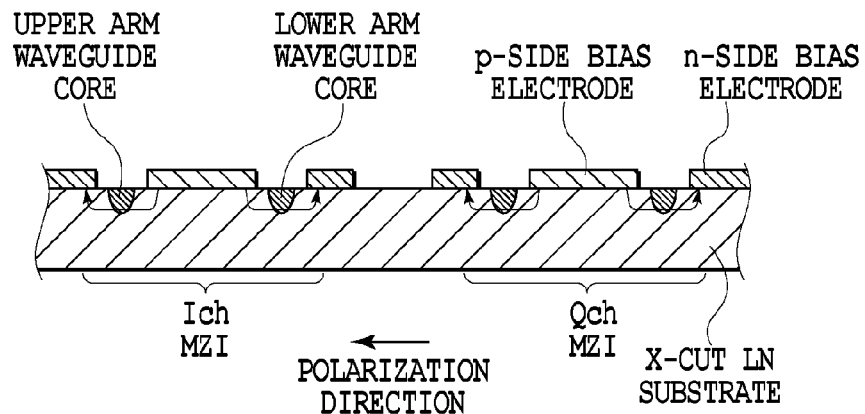
FIG. 24C is a cross-sectional view taken along the line XXIVC-XXIVC of FIG. 23.
Figure 24D:
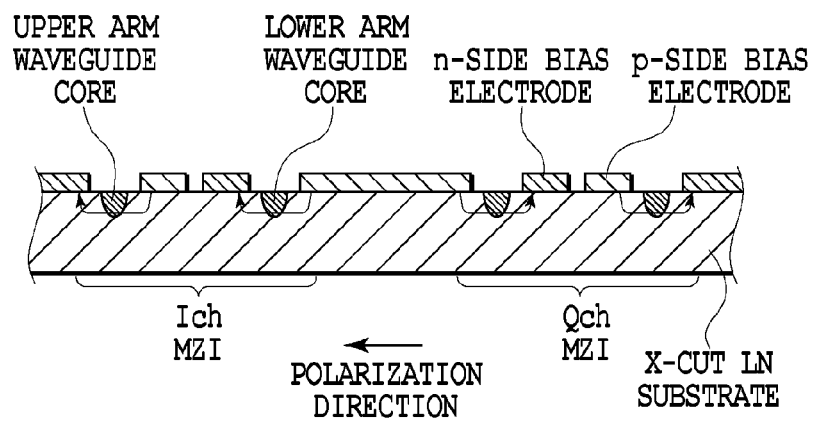
FIG. 24D is a cross-sectional view taken along the line XXIVD-XXIVD of FIG. 23.

FIG. 23 shows the configuration of the nest MZI modulator fabricated as an illustrative embodiment of the modification (embodiment 1b) of the first embodiment. FIG. 24A to FIG. 24D are a cross-sectional view taken along the line A-A', the line B-B', the line C-C', and the line D-D' of FIG. 23, respectively. The branch circuit/confluence circuit was prepared by providing a silica based waveguide (PLC) on a silicon substrate. The waveguide has a difference in the specific refractive index between the core and the clad is 1.5%. The waveguide of the modulation array section was formed by titanium diffusion on an X-cut LN substrate. Both of the substrates are connected to each other by ultraviolet curing adhesive agent. Similarly, input and output fibers are connected to the input and output of the PLC, respectively. This chip having a hybrid connection is mounted in a stainless (SUS) package having substantially the same thermal expansion coefficient as that of the LN substrate. The chip is fixed to the package by coating the back face of the LN substrate with conductive adhesive. The package includes a high-frequency terminal, a bias terminal, and a 50Ω terminating resistance and is electrically connected to the high-frequency electrode and the bias electrode of the LN substrate. The package body is electrically connected to the GND terminal.

The input-side PLC is configured to have thereon three symmetric Y branch circuits are connected to one another to configure a 1×4 branch circuit. The output-side PLC is configured to have thereon 2 symmetric Y confluence circuits connected to 2×2 couplers to configure a 4×2 confluence branch circuit. By providing the final stage not as a Y confluence circuit but as a 2×2 coupler, the signal light which has been conventionally discarded in a radiation mode in the Y confluence circuit can be used to obtain a monitor output without causing a tap loss. This monitor output is used to detect the above-described biasing error. Although this 2×2 coupler was a wavelength-independent coupler (WINC) providing the coupling characteristic/low loss characteristic in a wide band, if no wide band characteristic is required, an usual directional coupler or a multimode interference (MMI)-type coupler also may be used.

The LN substrate has thereon the total of 4 waveguides of 2 combinations of 2 waveguides. Each combination has a high-frequency electrode for converting a Data signal to a modulation signal and a bias electrode for adjusting each bias point. The high-frequency electrode has a traveling wave electrode structure with 50Ω impedance. The output side of the electrode is connected to a terminating resistance of 50Ω. Each bias electrode has a lumped-constant electrode structure and is connected to each bias terminal. From the viewpoints of the impedance of the high-frequency electrode and the traveling wave speed matching design, the ratio between the high-frequency electrode width and the electrode thickness and the ratio between the high-frequency electrode and the GND electrode are about 1:1. On the other hand, the bias electrode of the relative phase adjusting section must be configured so that 2 waveguides have therebetween 2 electrodes at the maximum. Thus, the high-frequency electrode section having the same waveguide pitch as that of the bias electrode section is not preferred due to the reasons of the process and the electric field distribution. Thus, this circuit is configured so that the waveguide between the high-frequency electrode section and the bias electrode section is provided as a curved waveguide (which corresponds to "pitch conversion section") for the conversion of a waveguide pitch. The wide pitch between waveguides is required in the bias electrode of the relative phase adjusting section. Thus, the pitch conversion section also may be provided between the modulation operating point adjusting section and the relative phase adjusting section. As described above, by appropriately converting the waveguide pitch even on the LN substrate as required, the process difficulty or an inconvenience in the electric field distribution can be avoided. The 2 waveguide pitches in the combination were set to about 54 um for the high-frequency electrode section and were set to about 200 um for the bias electrode section.

The fabricated nest MZI modulator had an insertion loss of about 3 dB and each MZI had an extinction ratio of 25 dB or more. The required OSNR in received signals when the Ich/Qch was driven by a pseudo random signal of a baud rate of 21.5 Gbaud (i.e., when the DQPSK modulation of 43 Gbps was performed) was about 13 dB in a differential receiver system using a delayed interferometer at a bit error rate of $10^{-3}$. This bit error measurement was performed by a commercially-available bias adjustment circuit. The result showed a smooth control operation without any particular problem.

Second Embodiment

Figure 7A:
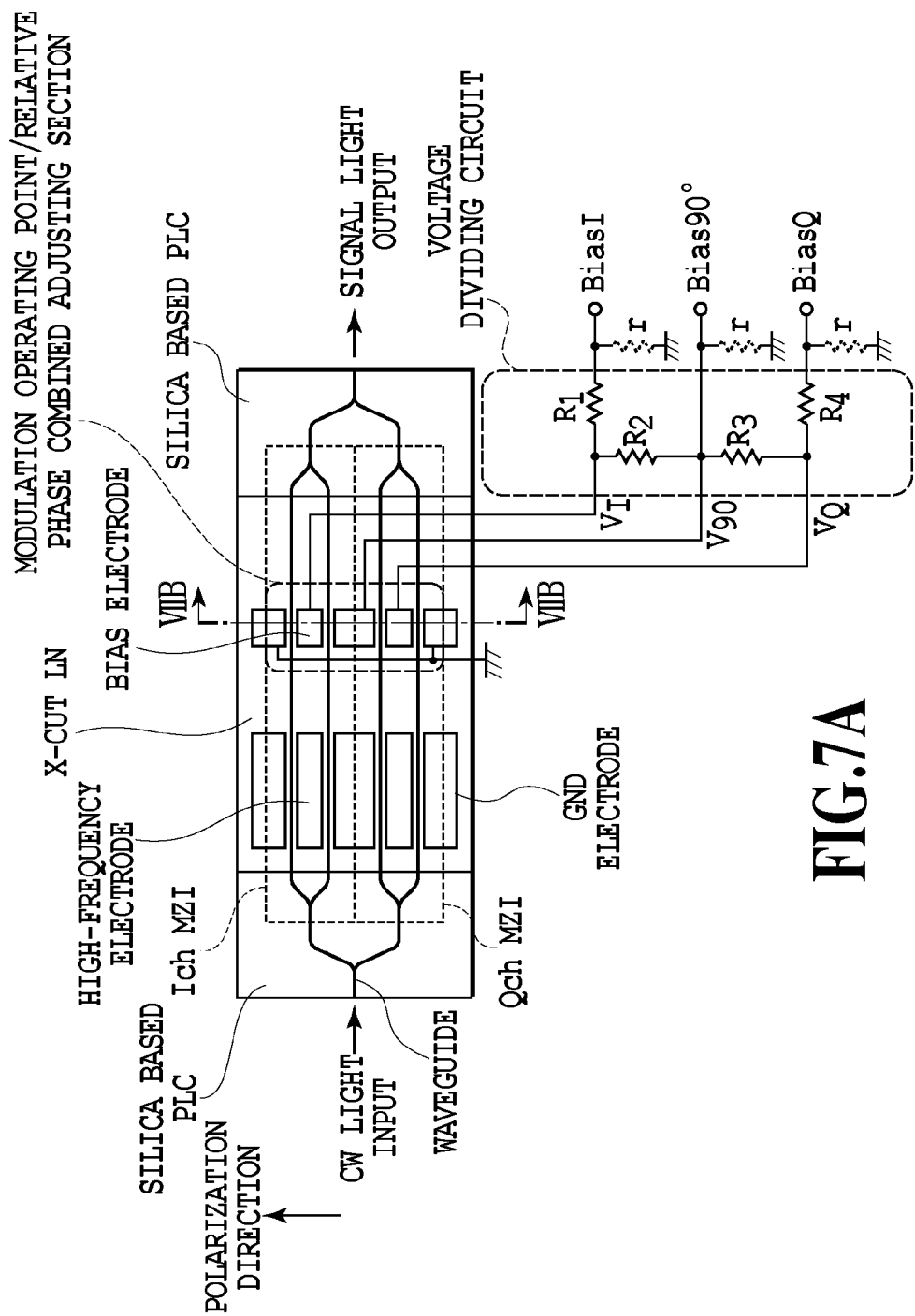
FIG. 7A is a top view illustrating the configuration of a hybrid integrated-type nest MZI modulator that is the second embodiment (embodiment 2a) of the invention of this application.

FIG. 7A illustrates the configuration of the hybrid integrated-type nest MZI modulator that is the second embodiment of the invention of this application (embodiment 2a). The configuration of this embodiment is significantly different in that the modulation operating point adjusting section and the relative phase adjusting section in the first embodiment are combined. Furthermore, each adjustment voltage was applied as the voltages $V_1$, $V_Q$, and $V_{90}$ actually applied via the voltage dividing circuit with a resistance network to each bias electrode.

The function of the resistance r connected from each terminal to GND will be described later. Thus, the following section will firstly describe the operation of the circuit that is not connected to the resistance r. The resistance values of $R_1$, $R_2$, $R_3$, and $R_4$ are set to an identical value of $R=R_1=R_2=R_3=R_4$.

First, the following section will describe the 90° phase adjustment of the parent MZI. For simplicity, it is assumed that the child MZI has operating point adjustment voltages $V_{BiasI}$ and $V_{BiasQ}$ of zero. Then, the voltages $V_I$, $V_Q$, and $V_{90}$ actually applied to each bias electrode can be represented by the following formulae.

$$V_I = \frac{V_{Bias90°}}{2}$$ Formula 4

$$V_Q = \frac{V_{Bias90°}}{2}$$

$$V_{90} = V_{Bias90°}$$

Figure 7B:
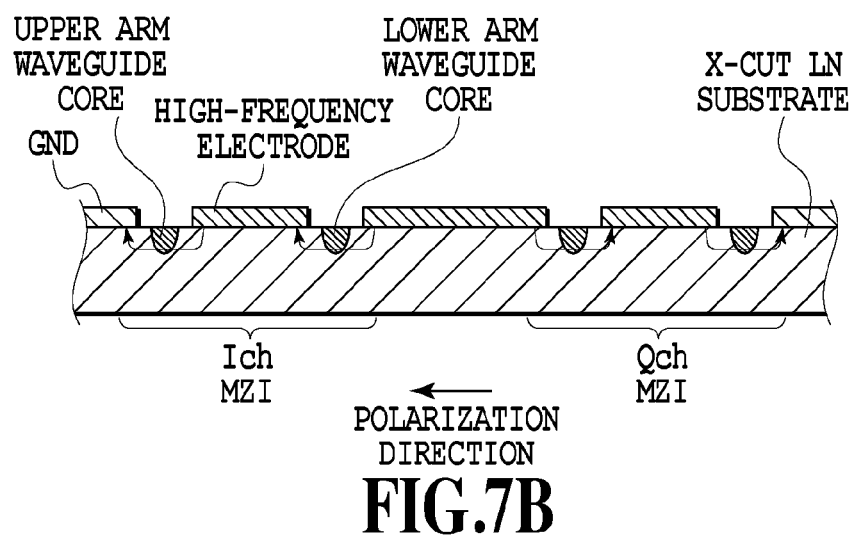
FIG. 7B is a cross-sectional view taken along the line VIIB-VIIB of FIG. 7A.

Thus, the voltage applied between the respective electrodes is a half of $V_{Bias90°}$. However, an electric field is applied in the same direction to the polarization direction in both of the upper and lower arms in the child MZI. Specifically, the Ich-side receives an electric field in the upper direction to both of the upper and lower arms and the Qch-side receives an electric field in the lower direction to both of the upper and lower arms. FIG. 7 illustrates the electric field at this time. Thus, as in the first embodiment, this terminal Bias90° can be used to perform the 90° phase adjustment of the parent MZI.

Next, the following section will describe the adjustment of the modulation operating point of the Ich-side child MZI. For simplicity, it is also assumed that operating point adjustment voltage $V_{Bias90°}$ of the parent MZI is zero. Then, the voltage $V_I$ actually applied to the bias electrode can be represented by the following formula.

$$V_I = \frac{V_{BiasI}}{2}$$ Formula 5

Thus, the voltage applied between the respective electrodes is a half of $V_{Bias90°}$. However, the electric field directions in the upper arm of the child MZI is opposite to that of the lower arm. Thus, an electric field is applied as in the modulation operating point adjusting section in the first embodiment shown in FIG. 4A. Thus, as in the first embodiment, this terminal BiasI can be used to perform the adjustment of the modulation operating point of the Ich-side child MZI. The same applies to the adjustment of the modulation operating point of the Qch-side child MZI.

In an actual operation, $V_{BiasI}$, $V_{BiasQ}$ and $V_{Bias90°}$ are applied at the same time. However, since the entire operation is a linear addition of the each operation, each operation can be handled independently as an individual operation.

As described above, this configuration also can use the voltage control to perform each bias adjustment. Furthermore, the operation with low power consumption can be performed if the resistance value R is sufficiently high so as to be prevented from being a burden on the driving circuit. Furthermore, when seeing from the bias control circuit-side, the type and the number of bias terminals as well as the bias adjustment method are completely the same as those of the monolithic-type modulator having the conventional configuration shown in FIG. 1A. Thus, a commercially-available bias control circuit used in a monolithic-type modulator can be directly used. Since only a half of the voltage applied to the terminal is substantially applied to the bias electrode, a driving efficiency is halved but this can be compensated by doubling the acting length of the bias electrode.

With regard to the loss compared to that of the first embodiment, this configuration is advantageous in providing a simple layout because the bias adjusting section is provided as one unit but is disadvantageous in requiring a voltage dividing circuit with a resistance network.

In this embodiment, the four voltage dividing resistances had the same resistance value R. However, if the four voltage dividing resistances have values different from one another, for example $R_1 \neq R_2$ and $R_3 \neq R_4$, a voltage applied to the $V_{Bias90°}$ terminal does not result in $V_I$ equal to $V_{90}$-$V_I$ even when $V_{BiasI}=0$ is established, thus causing different amounts of electric fields applied to both of the upper and lower arms of the child MZI. Thus, the biases of the child MZI function at the same time. This requires a proportional compensation operation to add a voltage having an opposite operation on $V_{BiasI}$. The same applies to $V_{BiasQ}$. If the execution of such a compensation operation is allowed, these resistance values are not always required to be the same R. However, these resistance values desirably have the same R from the viewpoint of simplifying the control method by an independent operation of each input terminal.

Generally, the respective terminals BiasI, BiasQ, and Bias90° are connected to a voltage source or GND as described above. However, one of the respective terminals BiasI, BiasQ, and Bias90° may be used while being unconnected (open) in a few cases. In such a case, the potential of the unconnected terminal undesirably varies due to the influence by the potentials of other terminals, thus undesirably failing to provide the independent operation as described above. For example, when only the Bias90° is connected to the voltage source and other terminals are unconnected, $V_I=V_Q=V_{90}=V_{Bias90°}$ is established, thus failing to provide a desired operation. In order to avoid this, the potential of the unconnected terminal may be GND. In a specific configuration, each terminal may be connected to GND via the resistance r under a condition of r>>R. By this resistance r, the terminal voltage is a power-supply voltage when being connected to a voltage source and is substantially GND when being unconnected to the voltage source. When there is a possibility where one of the terminals is unconnected or when a connected voltage source is not an ideal voltage source because it cannot provide a sink operation, the configuration in which the resistance r connected thereto is desired. If these concerns are eliminated, the resistance r is not required also from the viewpoint of the power consumption.

The resistances R and r may be mounted as an external resistance to the outside of the modulator module. However, the resistances R and r provided in the modulator using a surface-mounted-type chip for example is more desirable because such resistances R and r can be used as a general modulator for the user of the module.

The bias adjustment configuration of this embodiment also can be exclusively used for the 90° phase adjustment of the parent MZI by connecting the BiasI terminal and BiasQ terminal to GND.

Figure 8:
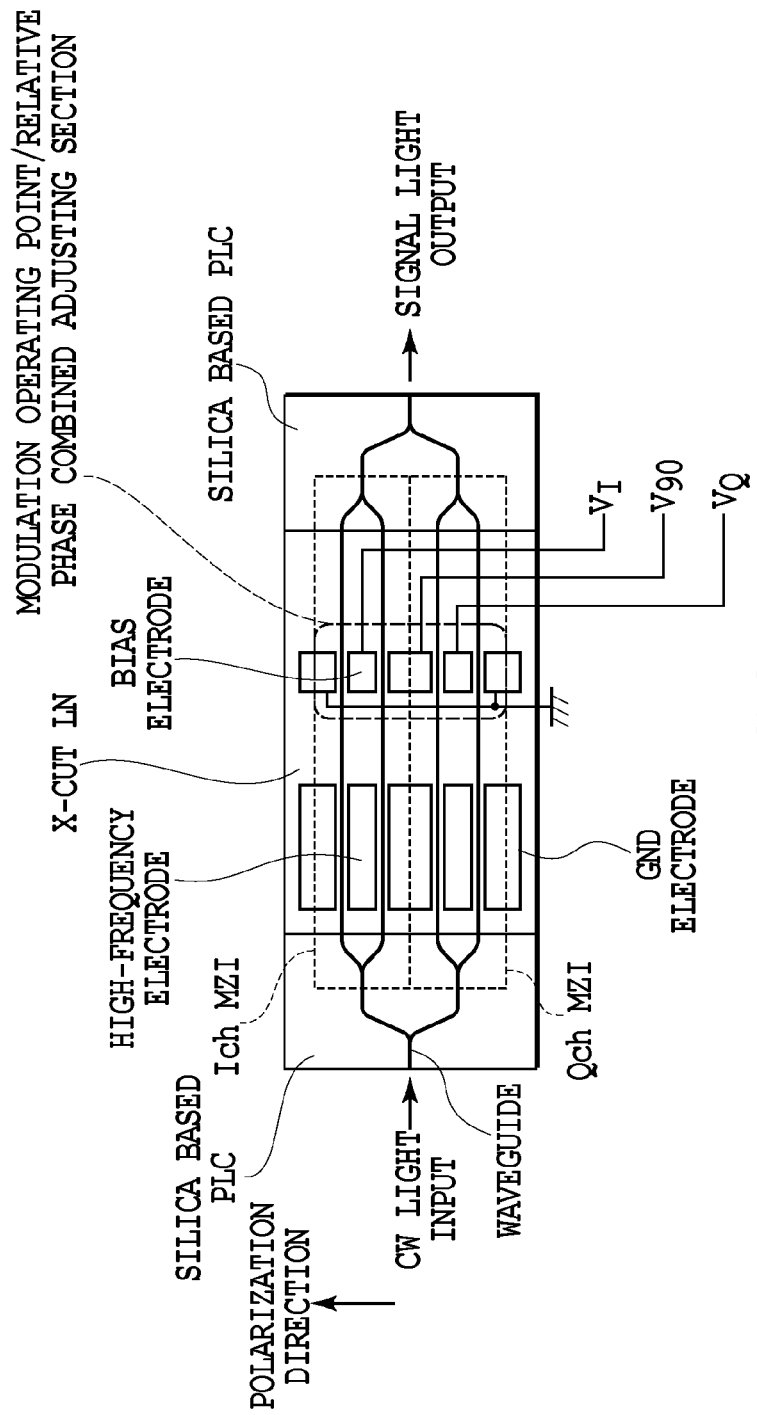
FIG. 8 illustrates the configuration of a hybrid integrated-type nest MZI modulator that is a modification of the second embodiment of the invention of this application (embodiment 2b).

FIG. 8 illustrates the configuration of the hybrid integrated-type nest MZI modulator that is a modification of the second embodiment of the invention of this application (embodiment 2b). In the embodiment 2a, the voltages $V_I$, $V_Q$, and $V_{90}$ actually applied to each bias electrode was calculated by a hardware called a voltage dividing resistance circuit and using one kind of analog computation. However, in the configuration of this embodiment, these voltages are calculated digitally in the control circuit to thereby omit the voltage dividing resistance circuit, which is different from the embodiment 2a.

The voltages $V_I$, $V_Q$, and $V_{90}$ applied to each bias electrode can be calculated by the following formulas.

$$V_I = V_{BiasI} + V_{Bias90°}$$

$$V_Q = V_{BiasQ} + V_{Bias90°}$$

$$V_{90} = 2 \cdot V_{Bias90°} \quad \text{Formula 6}$$

First, the following section will describe the 90° phase adjustment of the parent MZI. As in the embodiment 2a, for simplicity, the operation when $V_{BiasI}$ and $V_{BiasQ}$ are zero is considered, $V_I = V_Q = V_{Bias90°}$ and $V_{90} = 2 \cdot V_{Bias90°}$ are established. Thus, an electric field is applied in the same direction in both of the upper and lower arms of the child MZI. Specifically, the Ich-side receives an electric field in the upper direction in both of the upper and lower arms and the Qch-side receives an electric field in the lower direction in both of the upper and lower arms. Thus, it is understood the 90° phase adjustment of the parent MZI is possible as in the embodiment 2a.

Next, the following section will describe the adjustment of the modulation operating point of the child MZI. As in the previous section, the operation when $V_{Bias90°}$ is zero is considered, $V_I = V_{BiasI}$, $V_Q = V_{BiasQ}$, and $V_{90} = 0$ are established. Thus, the electric field directions in the upper arm of the child MZI is opposite to that of the lower arm. Thus, as in the embodiment 2a, the each child MZI can be subjected to the adjustment of the modulation operating point.

This configuration is similar to the above one in that the entire operation is a linear addition of the each operation. Thus, each operation can be handled independently as an individual operation.

In this configuration, the above conversion computation must be performed in the control circuit. However, such a computation can be provided by software without requiring a change in the hardware of the control circuit. Thus, in many cases, a commercially-available bias control circuit can be used by changing a firmware.

Figure 9A:
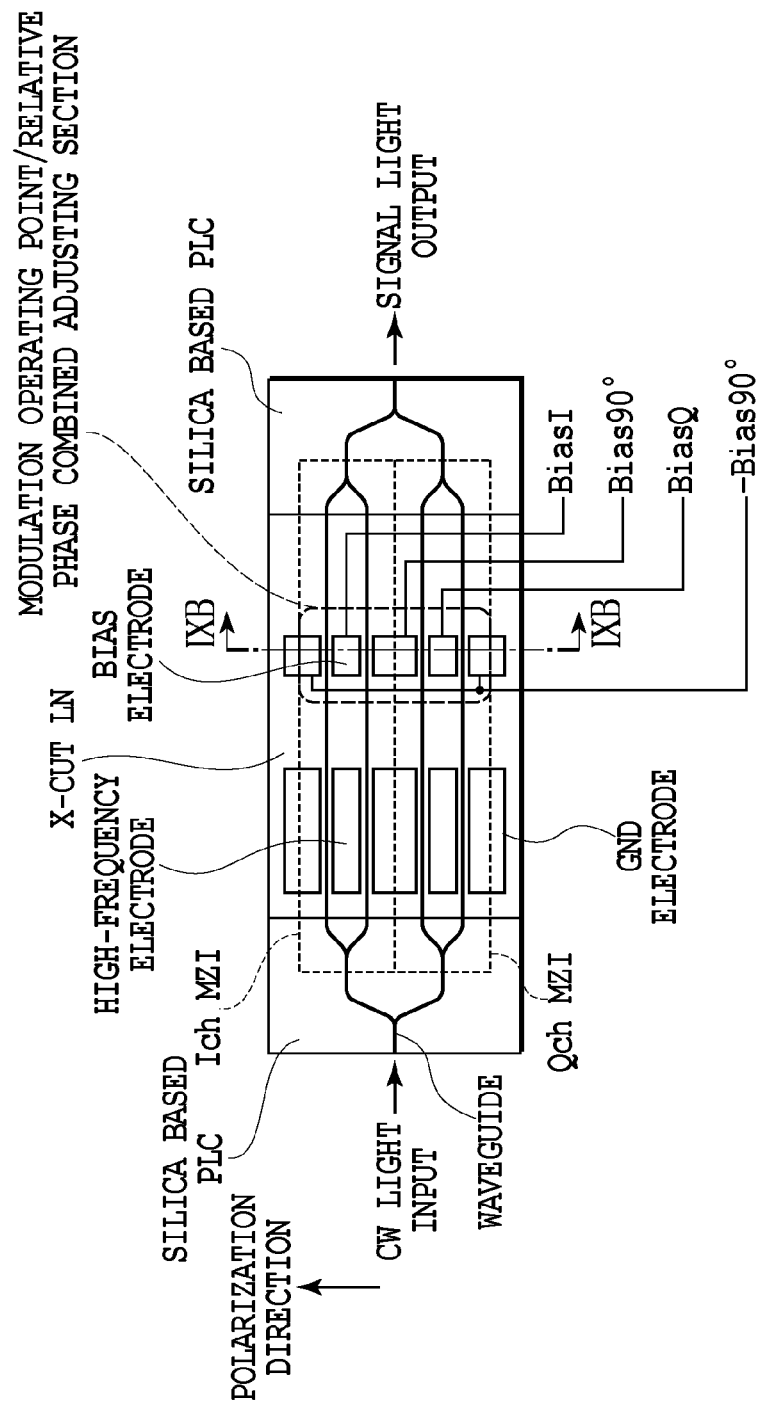
FIG. 9A illustrates the configuration of a hybrid integrated-type nest MZI modulator that is another modification of the second embodiment of the invention of this application (embodiment 2c).

FIG. 9A illustrates the configuration of the hybrid integrated-type QPSK modulator that is another modification of the second embodiment of the invention of this application (embodiment 2c). In this configuration, the GND electrode of the combined adjusting section for the modulation operating point/relative phase in the embodiment 2b is used as a differential input to the input of Bias90°, which is different from the embodiment 2b.

Figure 9B:
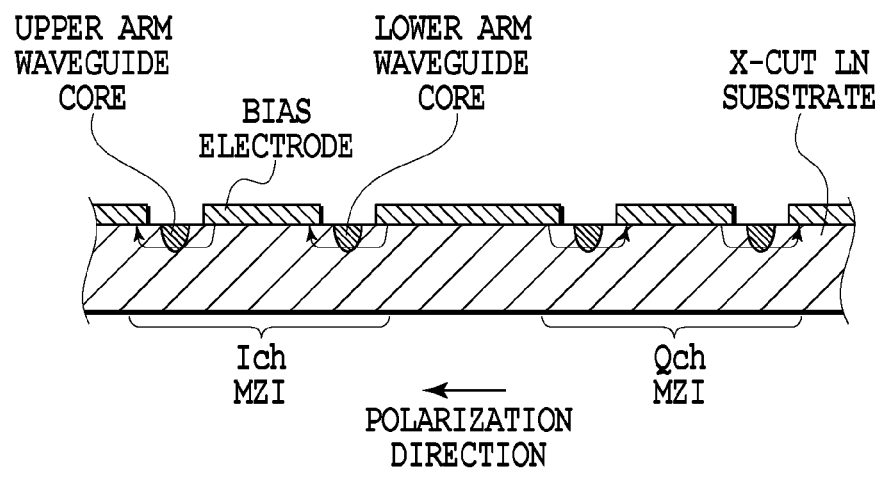
FIG. 9B is a cross-sectional view taken along the line IXB-IXB of FIG. 9A.

As in the previous section, the operation when $V_{BiasI}$ and $V_{BiasQ}$ are zero is considered in the operation of this configuration, an electric field is applied in the same direction to the polarization direction in both of the upper and lower arms of the child MZI. Thus, it is understood that the parent MZI can be subjected to the 90° phase adjustment as in the embodiments 2a and 2b. FIG. 9B illustrates the electric field in this situation. Furthermore, when considering the operation when $V_{Bias90°}$ is zero, the electric field directions in the upper arm of the child MZI is opposite to that of the lower arm. Thus, it is understood that each child MZI can be subjected to the adjustment of the modulation operating point. Furthermore, each operation can be handled independently as an individual operation during the simultaneous operation as in the previous section.

In this configuration, the terminals of Bias90° and −Bais90° must use a differential output driving circuit. However, a commercially-available bias control circuit can be directly used because there is no need to perform the computation in the control circuit. Furthermore, there is no need to provide a voltage dividing resistance circuit.

Third Embodiment

Figure 10A:
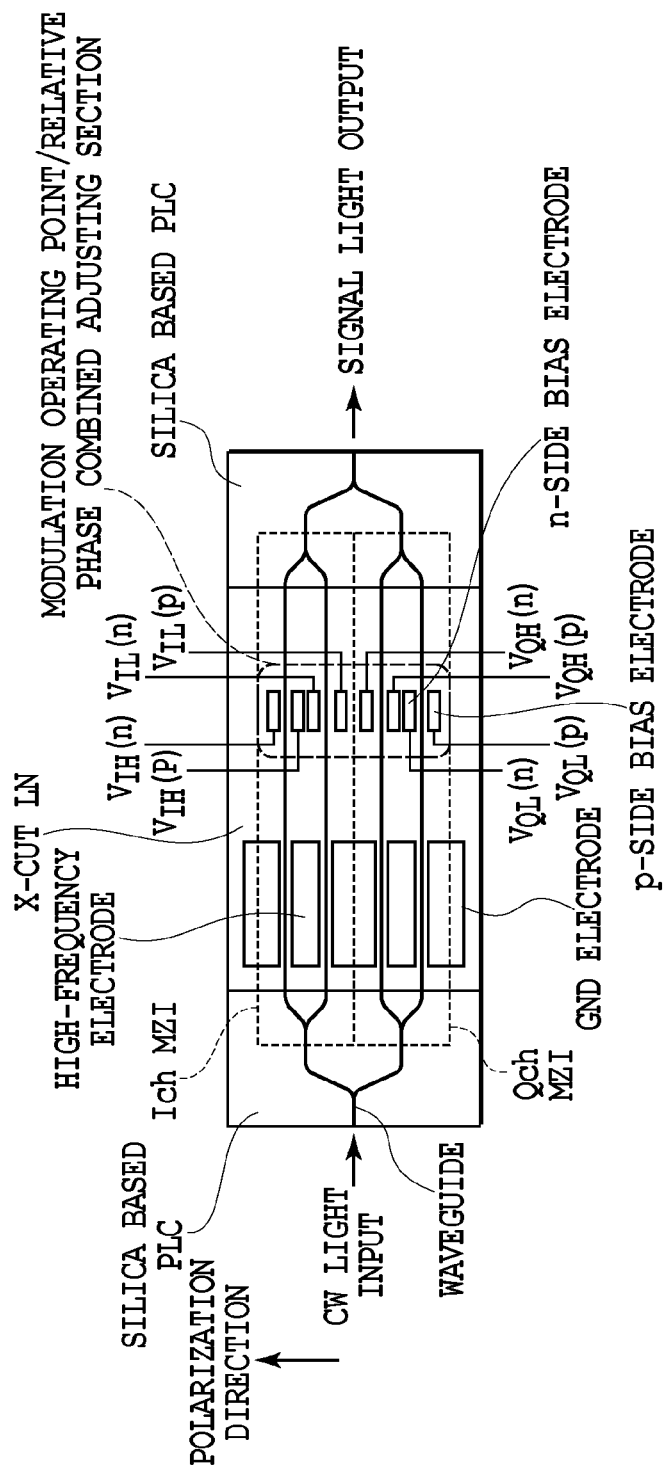
FIG. 10A illustrates the configuration of a hybrid integrated-type nest MZI modulator that is the third embodiment of the invention of this application.

FIG. 10A illustrates the configuration of the hybrid integrated-type nest MZI modulator that is the third embodiment of the invention of this application. In this configuration, the modulation operating point adjusting section and the relative phase adjusting section include completely-independent electrodes so that electric fields applied to the respective arms of the respective MZI modulators can be individually controlled, which is different from the embodiments 1 and 2. A voltage actually applied to each electrode is digitally calculated as in the embodiment 2b. The voltages applied to the respective bias electrodes can be calculated by the following formulae.

$$V_{IH(p)} = V_{biasI} + V_{Bias90°}$$

$$V_{IL(p)} = -V_{BiasI} + V_{Bias90°}$$

$$V_{QH(p)} = V_{BiasQ} - V_{Bias90°}$$

$$V_{QL(p)} = -V_{BiasQ} - V_{Bias90°} \quad \text{Formula 7}$$

$$V_{IH(n)} = V_{BiasI} - V_{Bias90°}$$

$$V_{IL(n)} = V_{BiasI} - V_{Bias90°}$$

$$V_{QH(n)} = -V_{BiasQ} + V_{Bias90°}$$

$$V_{QL(n)} = V_{BiasQ} + V_{Bias90°} \quad \text{Formula 8}$$

This configuration also uses the similar approach as in the embodiment 2b. Thus, the 90° phase adjustment of the parent MZI and the adjustment of the modulation operating point of the respective child MZIs can be performed individually.

As in the embodiment 1b, an electrode having a combination of n and p can be also configured so that only one side is driven and the other side is connected to GND. However, the adjustment capacity can be doubled by using both electrodes as a differential input.

When this configuration is compared with those of the embodiments 1 and 2, the number of the electrode terminals is increased and the number of the driving circuits must be increased. Thus, whether a commercially-available control circuit can be used only by a change of the firmware is different depending on a case. However, since this configuration only requires the control of the EO phase shifter as in the embodiments 1 and 2, this configuration can provide the advantage of reduced power consumption and the advantage of the reduced PLC cost enabled by the elimination of the need for a TO phase shifter.

Figure 10B:
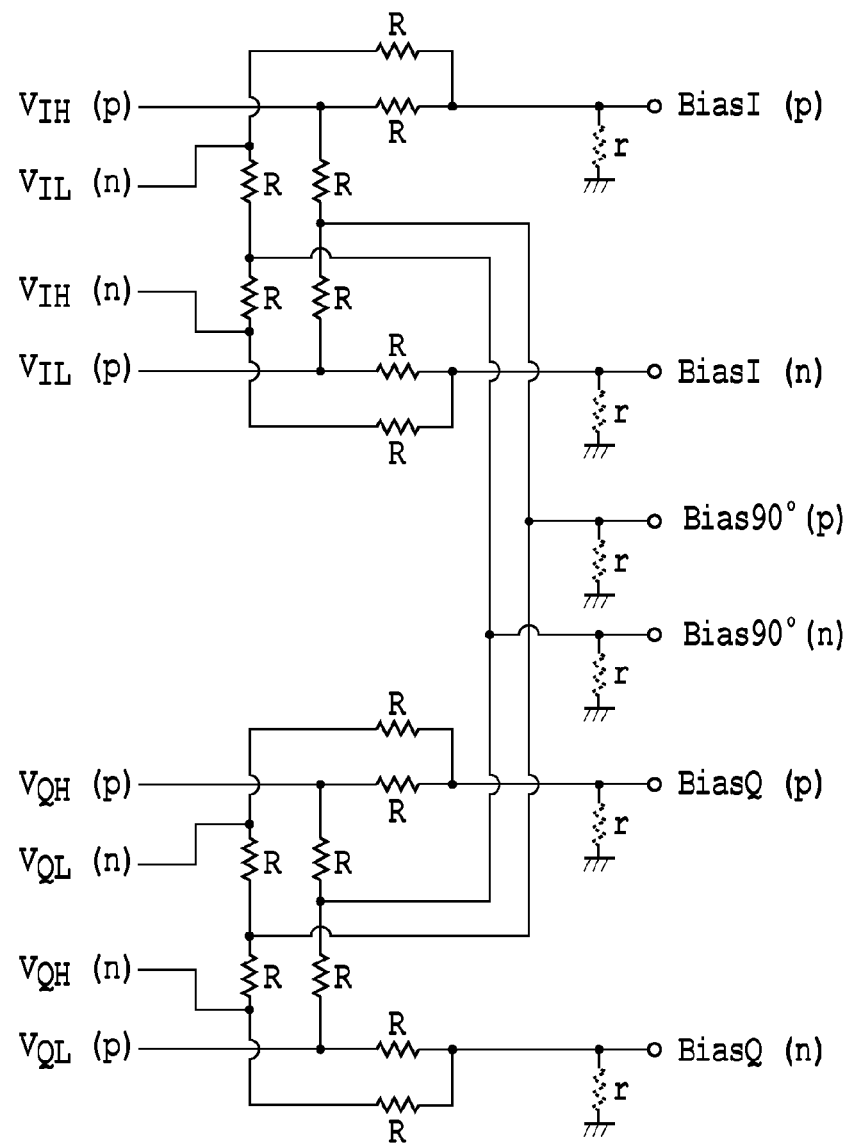
FIG. 10B illustrates a specific example of a voltage dividing resistance circuit that can be applied to the third embodiment.
Figure 10C:
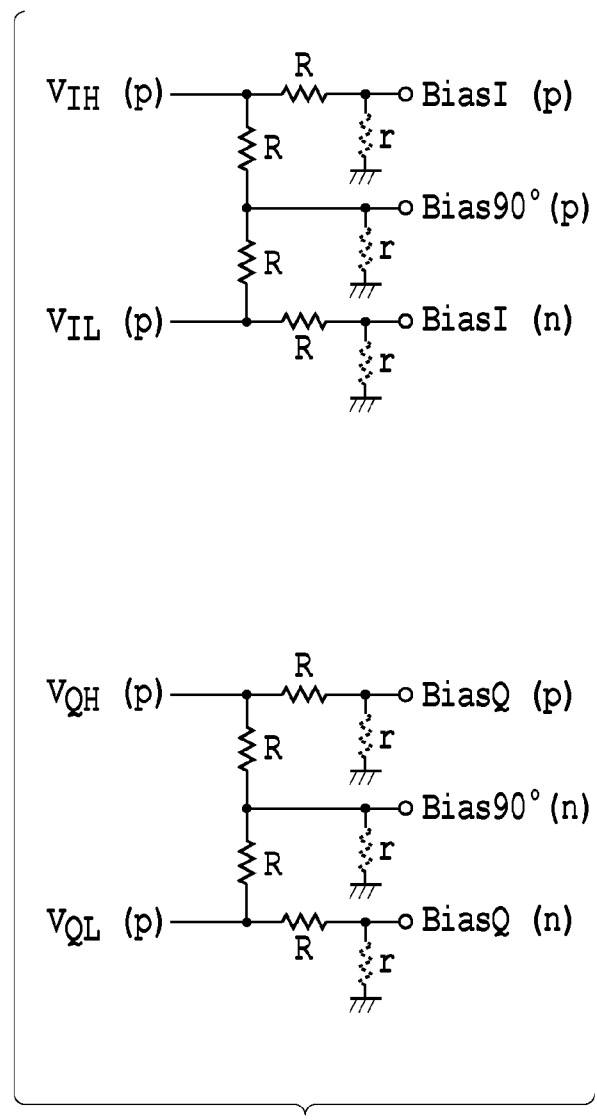
FIG. 10C illustrates an example of a voltage dividing resistance circuit when one side of the bias electrode is connected to GND (e.g., the n-side electrode is connected to GND).

The above-described digitally calculated voltages to the respective bias electrodes also can be calculated by the analog computation by the voltage dividing resistance circuit based on an opposite approach to that described in the embodiment 2a and the embodiment 2b. FIG. 10B illustrates a specific example of the voltage dividing resistance circuit that can be applied to this embodiment. FIG. 10C illustrates an example of the voltage dividing resistance circuit where one side of the bias electrode is connected to GND (e.g., the n-side electrode is connected to GND). The operations of these voltage dividing resistance circuits have a larger scale than that of the embodiment 2a. However, the operations are basically the same as that of the embodiment 2a.

The above section has described the configuration in which the invention of this application is applied to a nest MZI modulator (i.e., a QPSK modulator). However, the present invention is not limited to this and can be applied to various modulators.

Fourth Embodiment

Figure 11:
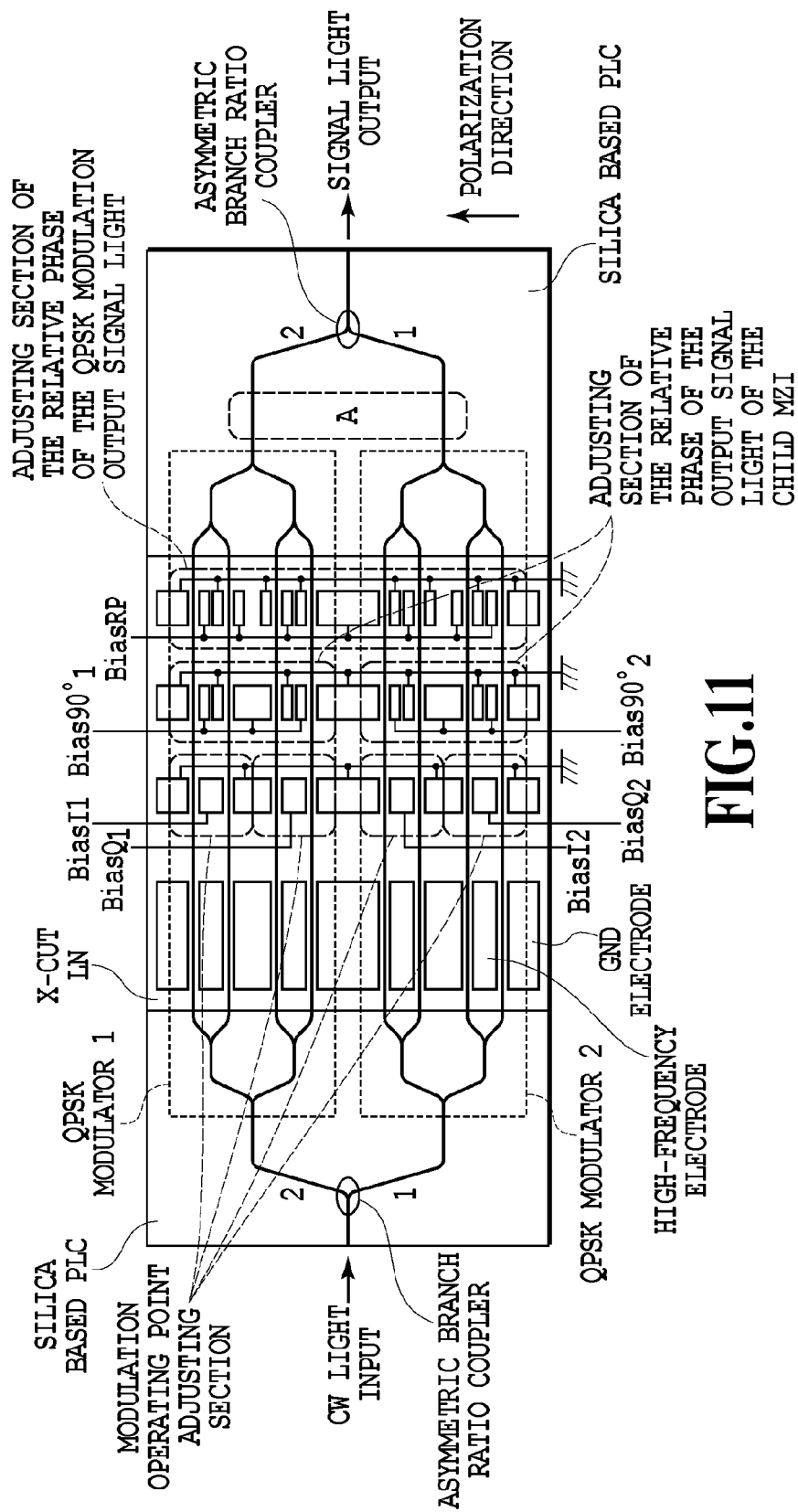
FIG. 11 illustrates the configuration (QAM embodiment 1) in which the invention of this application is applied to a parallel synthesis-type hexadecimal QAM modulator.

FIG. 11 illustrates the configuration in which the invention of this application is applied to a parallel synthesis-type hexadecimal QAM modulator (QAM embodiment 1). The parallel synthesis-type QAM modulator is configured so that QPSK modulators are parallely connected and the respective QPSK signals are subjected to a vector synthesis with a different power distribution ratio to thereby obtain a QAM signal. In the case of the hexadecimal QAM modulator as in FIG. 11, two QPSK modulators are parallely connected with a power distribution ratio of 2:1. As shown in FIG. 12A and FIG. 12B, the signal lights having passed through the respective QPSK modulators are converted to QPSK signals. Then, these signals have a amplitude ratio of 2:1 due to the power distribution ratio of 2:1. The output signal light as a QAM modulator is a signal with vector synthesis of these two signal lights and is a QAM signal having 16 signal points as shown in FIG. 12C. When the two QPSK signal lights have relative phase error, such a signal point (o) is caused that is dislocated from the position of the ideal signal point (x). Thus, the relative phases of both of the QPSK signals must be adjusted as in the 90° phase adjustment of the nest MZI modulator.

In order to adjust the relative phases of the QPSK output signals, this configuration is configured so that all of the four arm waveguides in the QPSK modulator have bias electrodes BiasRP that apply electric fields in the same direction to the polarization direction. The bias electrodes BiasRP are provided as the adjusting section for the relative phase of the QPSK output signal lights. By applying the electric fields as described above, the optical signals of the all arm waveguides of the QPSK modulator can respectively have a phase change in the same direction. In other words, the optical signals are subjected to a phase change after the output from the QPSK modulator (point A). Thus, the use of this bias electrode BiasRP can be used to adjust the relative phases of the QPSK output signals.

The bias electrodes for the adjustment of the modulation operating point in the QPSK modulator and the 90° phase adjustment are respectively provided separately as a modulation operating point adjusting section and an adjusting section for the relative phase of the output signal lights of the child MZIs as in the embodiment 1a.

Furthermore, the same approach also can be used for a QAM modulator having multiple values higher than the hexadecimal one. Specifically, a parallel-type $4^N$ value QAM modulator is configured so that N QPSK modulators are parallely connected with a power distribution ratio of $1:2:4:\ldots 2^{(N-1)}$. Then, in order to adjust the relative phases of the output signal lights from the respective QPSK modulators, all of the four arm waveguides in each QPSK modulator may have bias electrodes that apply an electric field in the same direction to the polarization direction.

In this QAM embodiment 1, the bias electrode BiasRP has a so-called single input configuration. However, based on the same approach as that according to which the bias electrode Bias90° of the embodiment 1a is changed from a single input configuration to a differential input configuration of the embodiment 1b, this bias electrode BiasRP can have a differential input configuration. The bias electrode Bias90° of this QAM embodiment 1 also can have a differential input configuration. Although the following section will basically describe a single input configuration, a differential input configuration also can be used in the following section.

Fifth Embodiment

Figure 13:
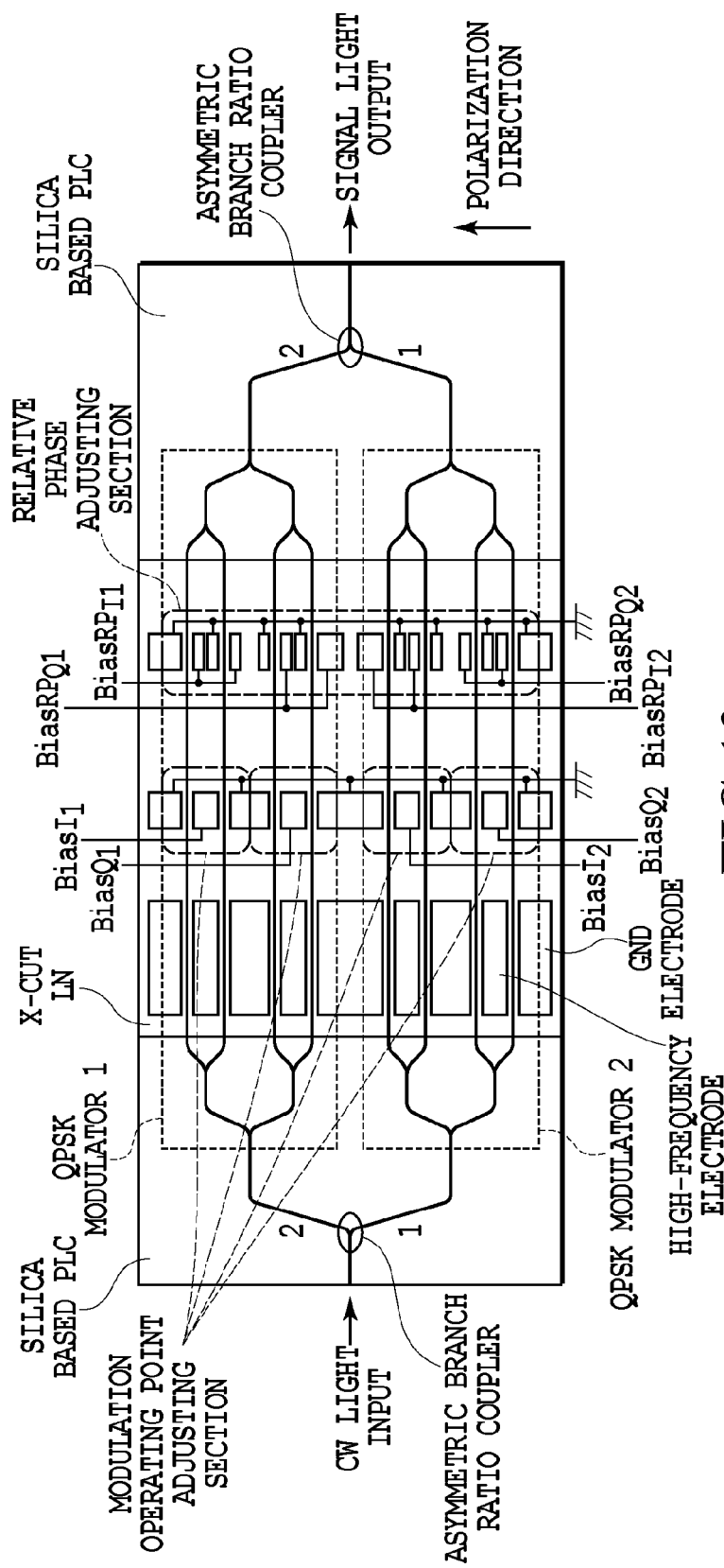
FIG. 13 illustrates the configuration (QAM embodiment 2) obtained by modifying the bias electrode configuration of the parallel synthesis-type QAM modulator of FIG. 11.

FIG. 13 illustrates the configuration obtained by modifying the bias electrode configuration of the above-described parallel synthesis-type QAM modulator (QAM embodiment 2. In the QAM embodiment 1, the QPSK modulators included therein the adjusting section for the relative phase of the output signal lights from the child MZIs and the adjusting section for the relative phase of the output signal lights from the QPSK modulators. However, these are combined in this embodiment as a relative phase adjusting section, which is different from the QAM embodiment 1.

The voltages actually applied to the respective electrodes may be calculated by the voltage dividing resistance circuit as in the embodiment of the QPSK modulator or also may be digitally calculated in the control circuit. The voltages actually applied to the respective electrodes can be calculated by the following formulae.

$$V_{BiasRP_{I1}} = V_{BiasRP} + V_{Bias90°_1}$$

$$V_{BiasRP_{Q1}} = V_{BiasRP} - V_{Bias90°_1}$$

$$V_{BiasRP_{I2}} = V_{BiasRP} - V_{Bias90°_2}$$

$$V_{BiasRP_{Q2}} = V_{BiasRP} + V_{Bias90°_2} \quad \text{Formula 9}$$

Alternatively, the bias electrode section also may be further combined so that, as in the nest MZI modulator, the modulation operating point adjusting section and the relative phase adjusting section may be combined. For example, as in the embodiment 3, the bias electrodes of the respective arms are independently controlled completely and voltages applied thereto are calculated by computation. Alternatively, another configuration as in the embodiment 2 also may be used in which a certain number of bias terminals are integrated to thereby reduce the number of control terminals.

Sixth Embodiment

Figure 14:
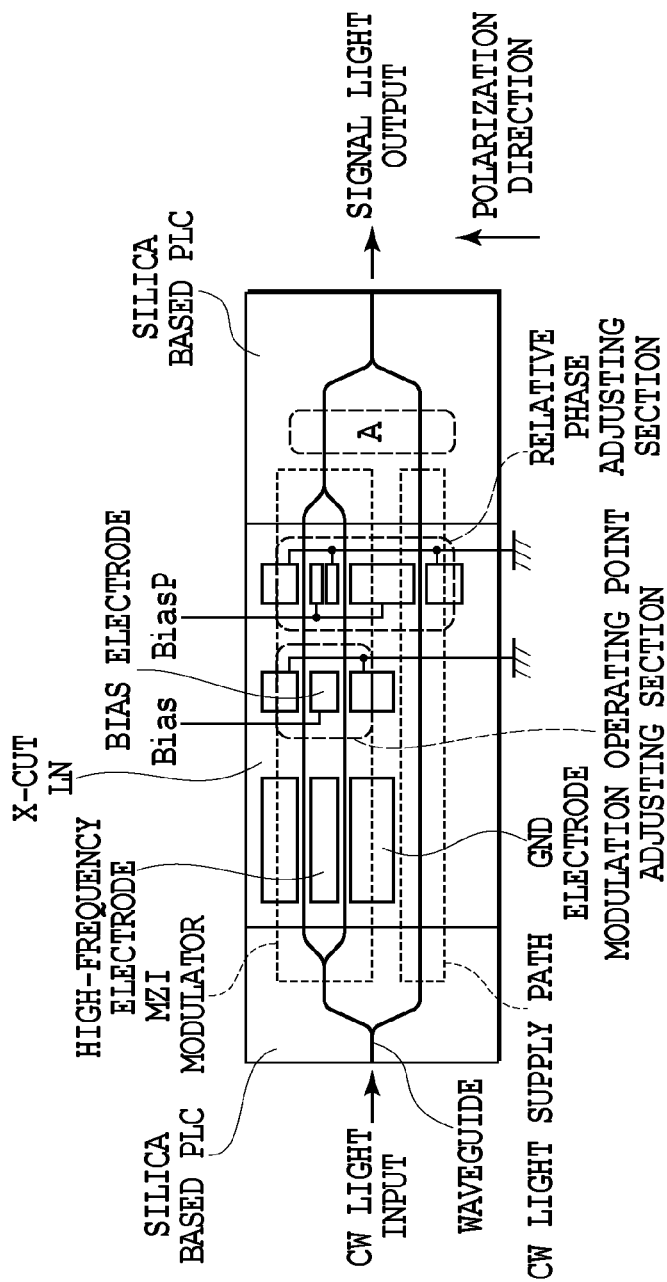
FIG. 14 illustrates the configuration where the invention of this application is applied to an APSK modulator.

FIG. 14 illustrates the configuration of an application example to another modulator in which the invention of this application is applied to an APSK modulator. By connecting a QPSK modulator to this modulator in a dependent manner, an 8-value APSK modulation signal can be generated.

This modulator can provide a binary modulation signal at an arbitrary signal point by causing the CW light to couple the PSK signal from the MZI modulator operating as a phase modulator. The light having passed through the CW light supply path has a signal point position as shown in FIG. 15A. The signal light having passed through the MZI modulator has a signal point position shown in FIG. 15B. Then, by appropriately setting the branch ratio between these lights and the relative phase relation therebetween, the output obtained by synthesizing these lights can have an arbitrary position as shown in FIG. 15C.

In this configuration, the bias electrode BiasP in which both of the upper and lower arm waveguides in the MZI modulator apply an electric field in the same direction of the polarization direction is provided as a relative phase adjusting section. By applying the electric field in the manner as described above, the optical signals of the upper and lower arm waveguides of the MZI modulator can be subjected to a phase change in the same direction, respectively. In other words, the optical signals are subjected to a phase change after the output from the MZI modulator (point A). Thus, this bias electrode BiasP can be used to adjust the relative phase of the MZI modulator output signal and the light having passed through the CW light supply path.

As in this example, the invention of this application can be widely applied not only to the adjustment of the relative phase of the output lights of MZI modulators but also to the adjustment of the relative phase of the output light from the MZI modulator and the output light having passed through another passive circuit for example.

Seventh Embodiment

Figure 16A:
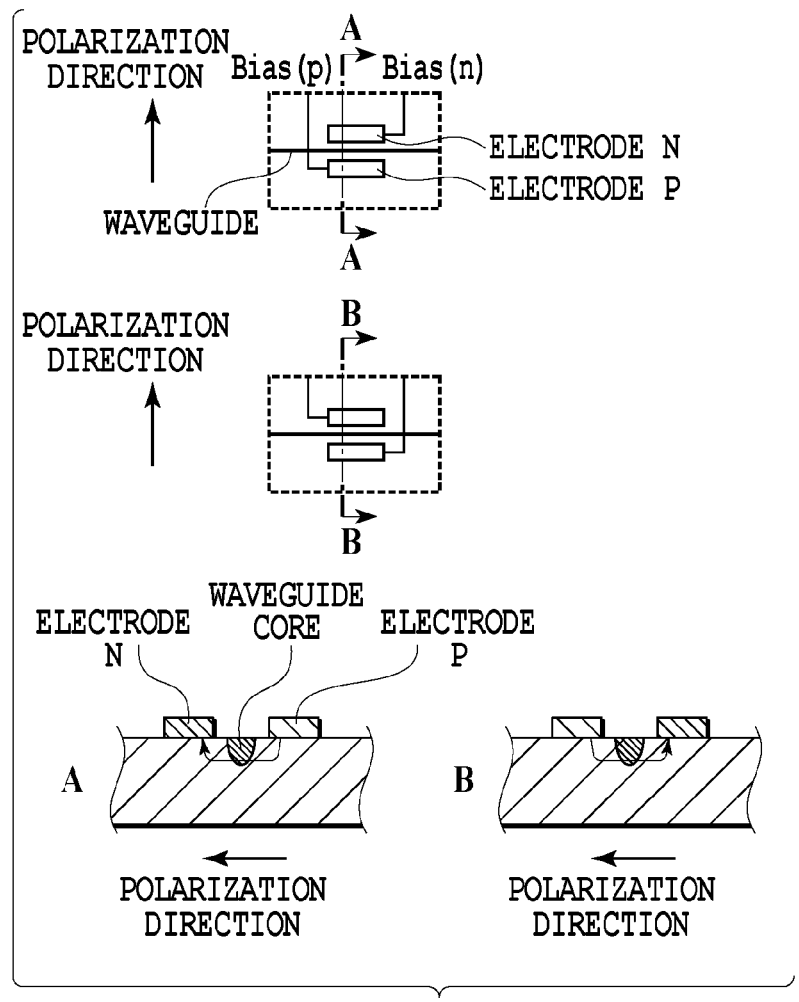
FIG. 16A illustrates the general principle when the invention of this application is applied to a Z-cut substrate and shows the case where the general principle when the invention of this application is applied to an X-cut substrate.
Figure 16B:
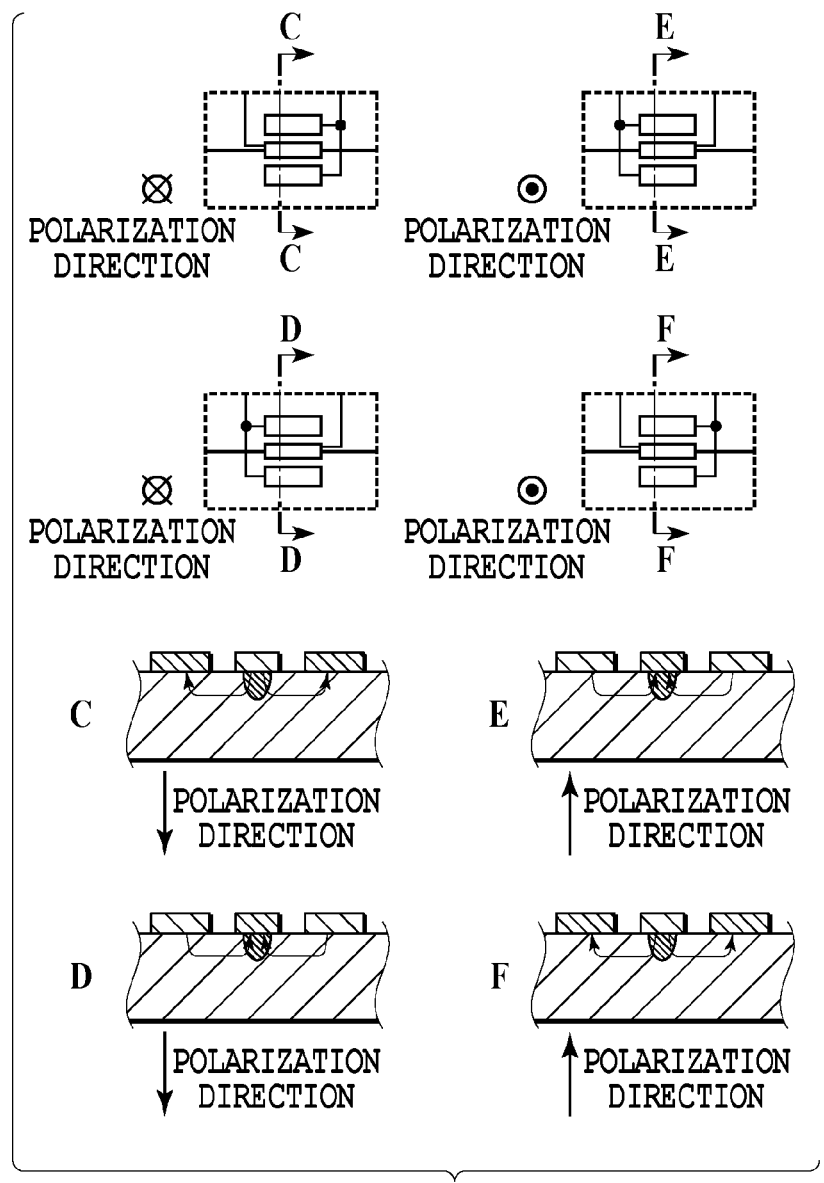
FIG. 16B illustrates the general principle when the invention of this application is applied to a Z-cut substrate and shows the case where the general principle when the invention of this application is applied to a Z-cut substrate.

The modulator examples as described above have been described via an example of a modulator using an X-cut substrate. However, the present invention is not limited to this. The invention also can be similarly used for substrates having other directions such as a Z-cut substrate. Since the Z-cut substrate has polarization vertical to the substrate surface, electrodes are arranged so as to apply an electric field in a direction vertical to the waveguide core. FIG. 16 shows the general principle for applying the present invention to a modulator of a Z-cut substrate. Basically, the relation between the direction of the electric field caused by the two electrodes P and N in the waveguide core part and the direction of the substrate polarization are the same. In other words, if the direction of the electric field is same with that of the substrate polarization, the direction of the electric field is to be same with that of the substrate polarization. If the direction of the electric field is opposite with that of the substrate polarization, the direction of the electric field is to be opposite with that of the substrate polarization. This principle can be applied to the embodiments of the respective modulators thus described and thus can be applied to a Z-cut substrate also.

Figure 17A:
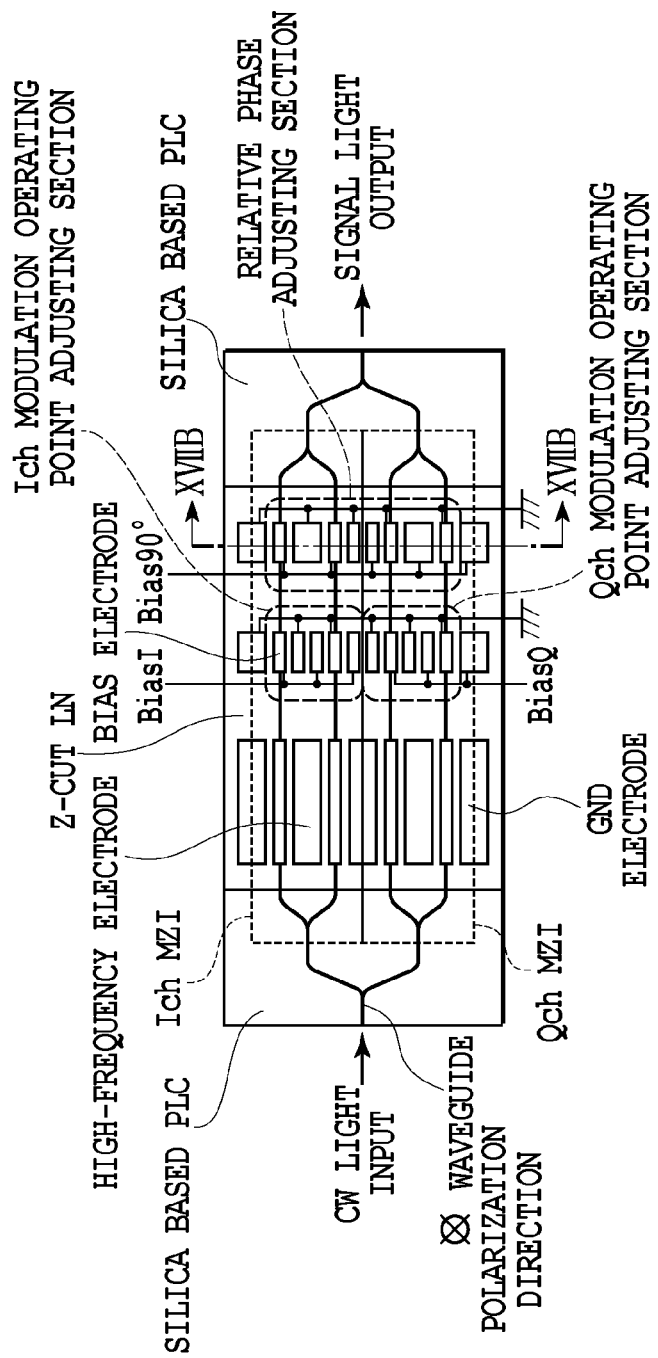
FIG. 17A illustrates the configuration of the embodiment 1a of the QPSK modulator using a Z-cut substrate.
Figure 17B:
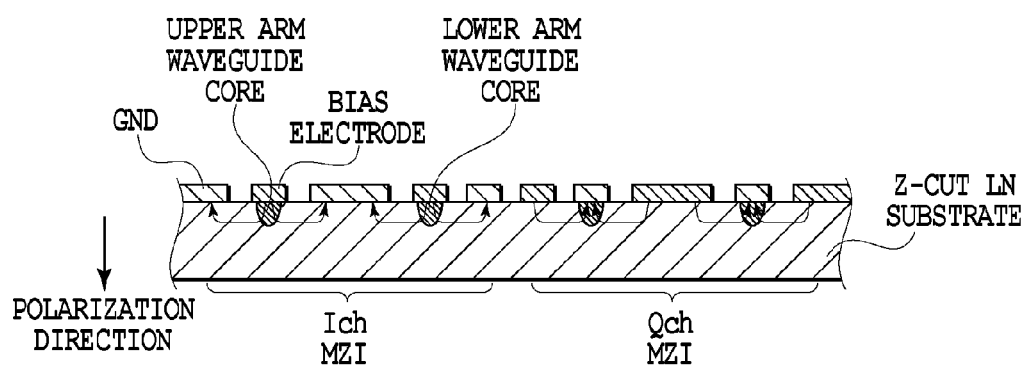
FIG. 17B is a cross-sectional view taken along the line XVIIB-XVIIB of FIG. 17A.

As an example using a Z-cut substrate, FIG. 17A illustrates the configuration of the embodiment 1a of the nest MZI modulator. This configuration is also configured so that the child MZI includes therein the bias electrode Bias90° in which an electric field is in the same direction to the polarization direction in both of the upper and lower arms. The bias electrode Bias90° is provided as a relative phase adjusting section of the parent MZI. Thus, the optical signals of the upper and lower arm waveguides of the child MZI can be subjected to a phase change in the same direction, respectively. In other words, the optical signals are subjected to a phase change after the output from the child MZI, thus eliminating the need to provide a relative phase adjustment electrode at the rear stage of the child MZI.

Thus, this configuration is similar to the embodiment of the X-cut substrate in that even the hybrid integrated-type one can be subjected to a bias adjustment only by an EO phase shifter without using a TO phase shifter. Furthermore, when seeing from the bias control circuit-side, the type and the number of bias terminals as well as the bias adjustment method are completely the same as those of the monolithic-type modulator having the conventional configuration. Thus, a commercially-available bias control circuit used in a monolithic-type modulator having a conventional configuration can be used without any change.

Figure 18A:
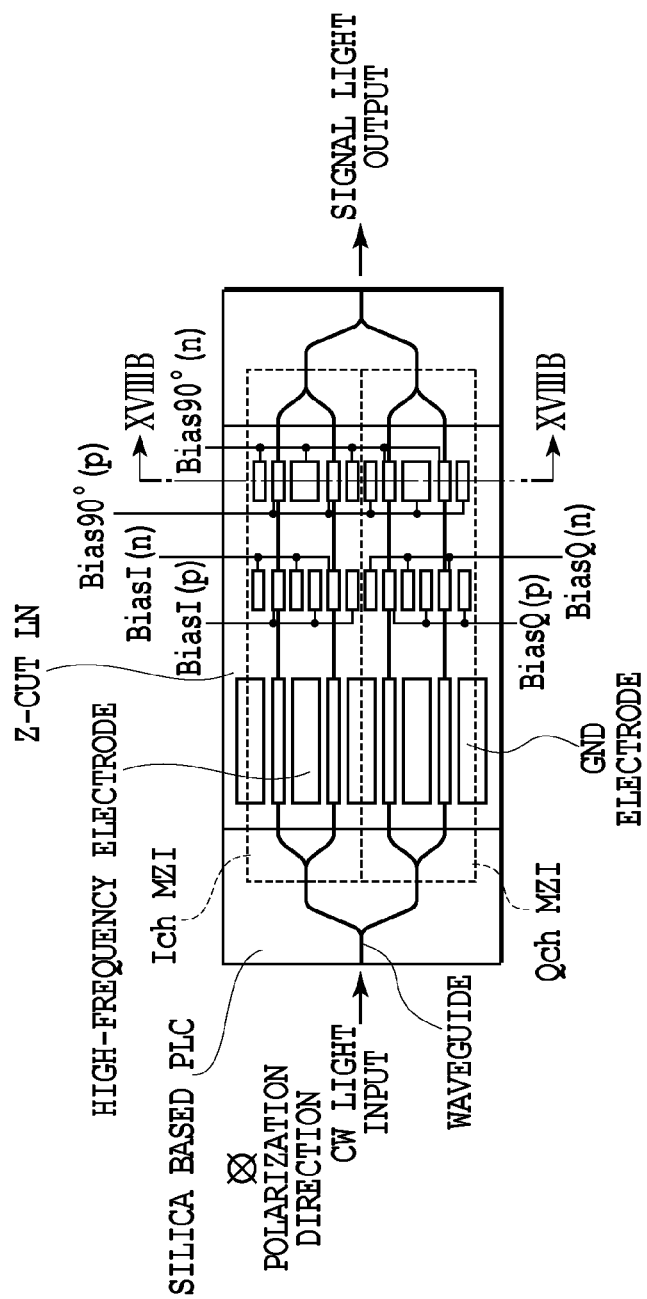
FIG. 18A illustrates an example in which a Z-cut substrate is used in the nest MZI modulator of the embodiment 1b shown in FIG. 6A.
Figure 18B:
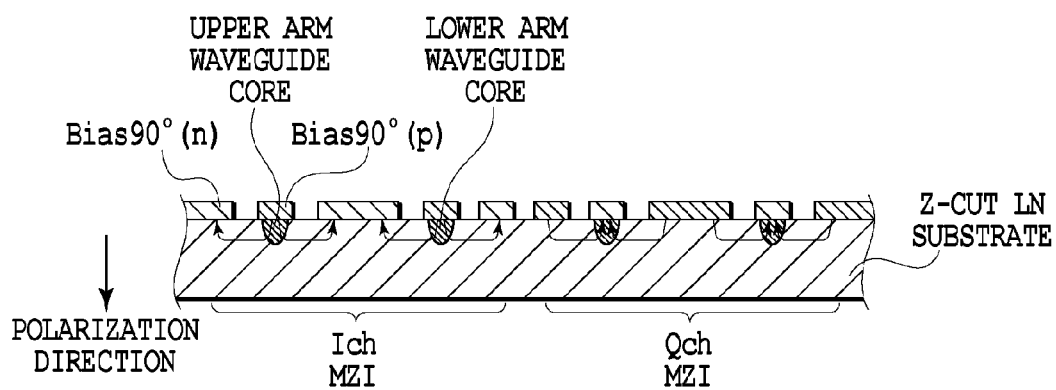
FIG. 18B is a cross-sectional view taken along the line XVIIIB-XVIIIB of FIG. 18A.

FIG. 18A illustrates an example in which a Z-cut substrate is used for the nest MZI modulator of the embodiment 1b shown in FIG. 6A. FIG. 18B is a cross-sectional view taken along the line XVIIIB-XVIIIB of FIG. 18A.

Figure 18C:
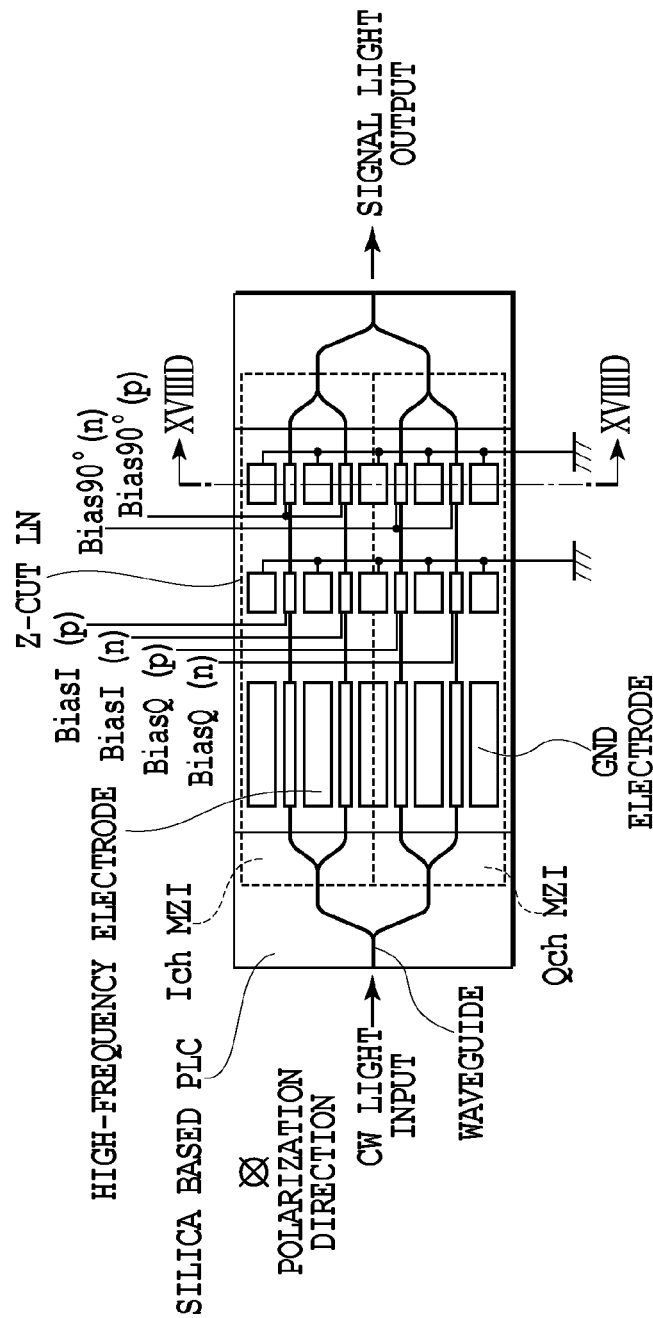
FIG. 18C illustrates a derivative configuration of the configuration shown in FIG. 18A.
Figure 18D:
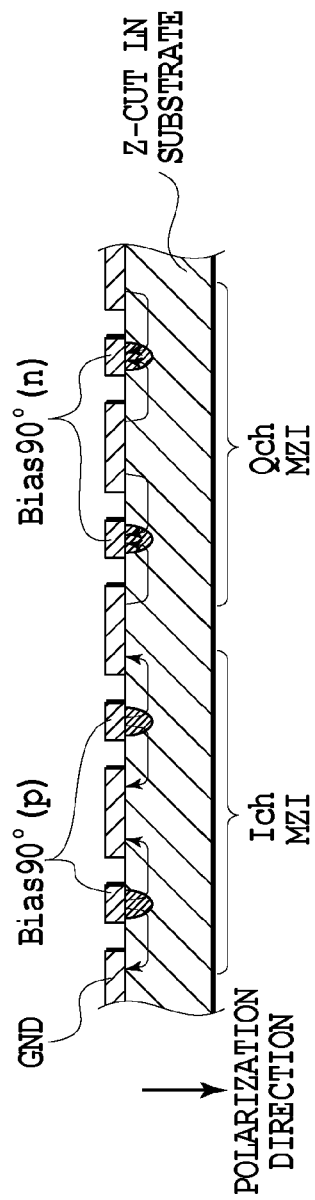
FIG. 18D is a cross-sectional view taken along the line XVIIID-XVIIID of FIG. 18A.

FIG. 18C illustrates a derivative configuration of the configuration shown in FIG. 18A. FIG. 18C illustrates a configuration in which the bias electrode of FIG. 18A is changed by changing an electrode not existing just above the waveguide to a GND electrode. In this configuration, since a part of the electrode functioning as a driving electrode in FIG. 18A is used as a GND electrode, the phase adjustment capacity is proportionally reduced. FIG. 18D is a cross-sectional view taken along the line XVIIID-XVIIID of FIG. 18C.

Figure 19A:
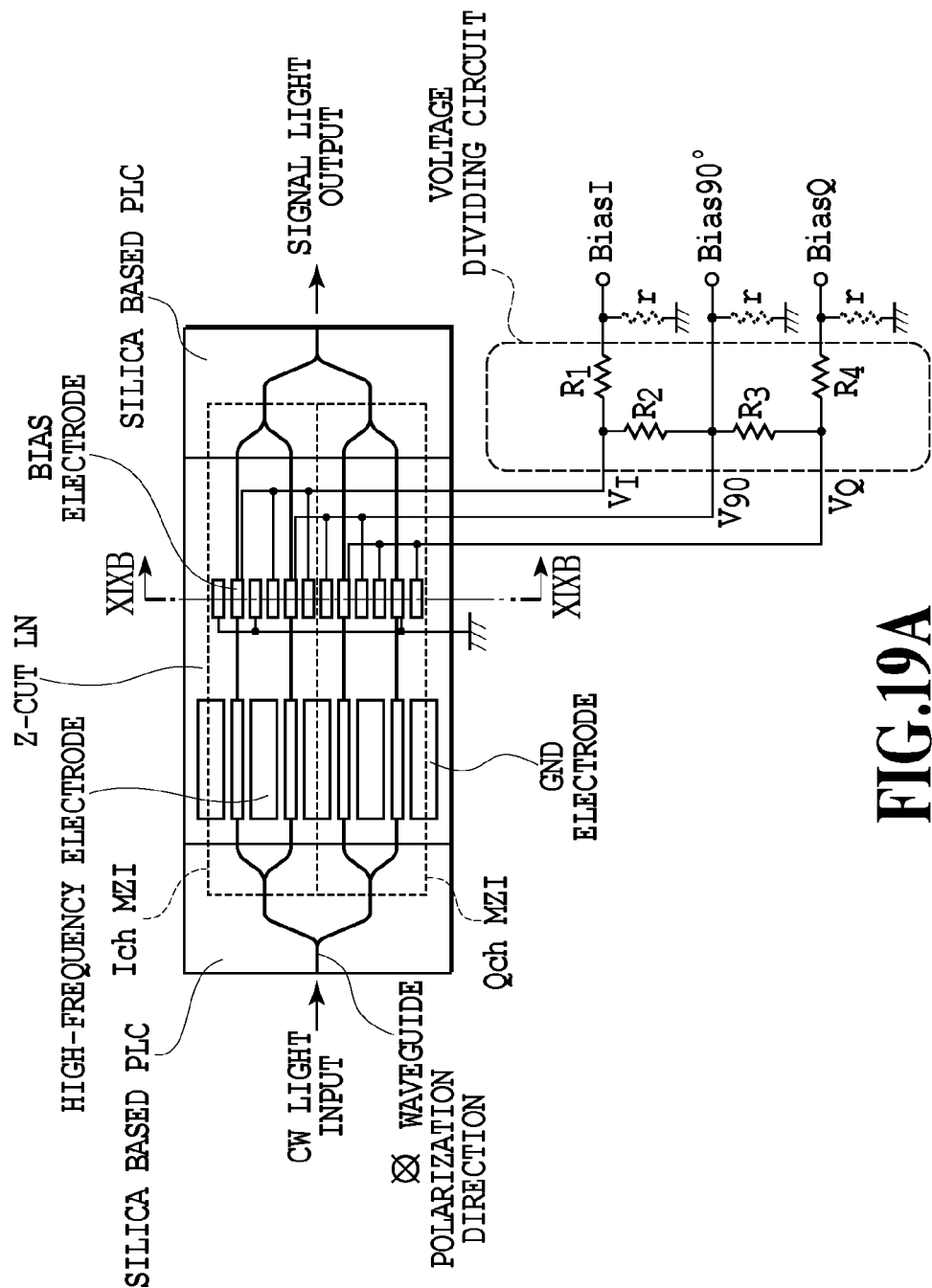
FIG. 19A illustrates an example in which a Z-cut substrate is used in the nest MZI modulator of the embodiment 2a shown in FIG. 7A.
Figure 19B:
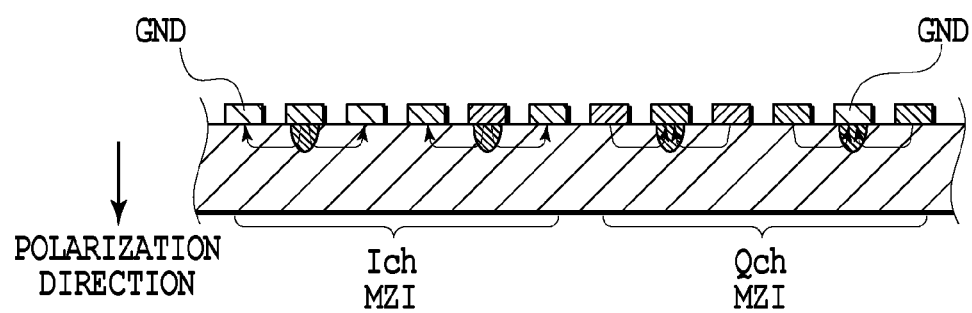
FIG. 19B is a cross-sectional view taken along the line XIXB-XIXB of FIG. 19A.

FIG. 19A illustrates an example in which a Z-cut substrate is used for the nest MZI modulator of the embodiment 2a shown in FIG. 7A. FIG. 19B is a cross-sectional view taken along the line XIXB-XIXB of FIG. 19A. These drawings also apply to the case where a Z-cut substrate is used for the nest MZI modulator of embodiments 2b and 2c.

Figure 20:
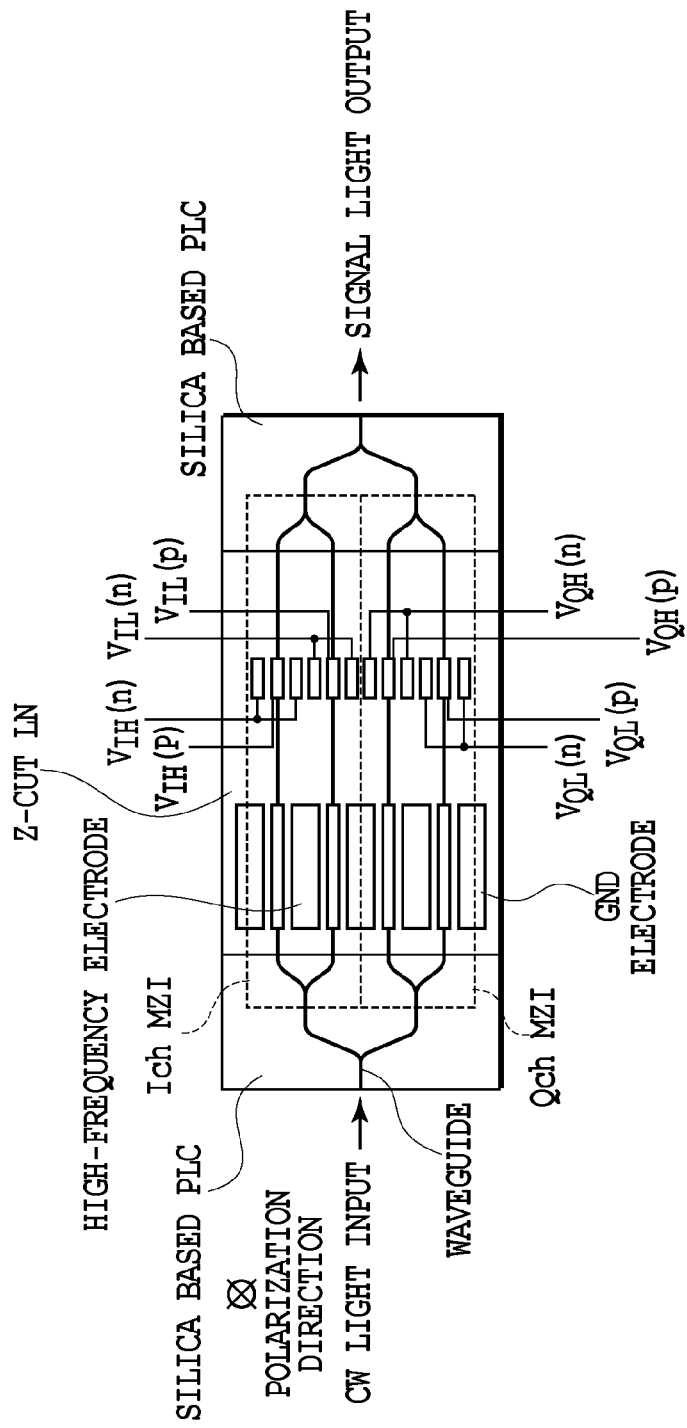
FIG. 20 is an example in which a Z-cut substrate is used in the nest MZI modulator of the third embodiment shown in FIG. 10.

FIG. 20 illustrates an example where a Z-cut substrate is used for the nest MZI modulator of the third embodiment shown in FIG. 10.

The fourth to sixth embodiments as well as the eighth and ninth embodiments also can be similarly applied to the configuration using a Z-cut substrate.

Eighth Embodiment

In the modulator examples thus described, the configuration of the invention of this application has been described mainly with regard to the electrode layout. However, another configuration also may be used where the electrode layout is used together with a polarization-inverted structure.

Figure 21A:
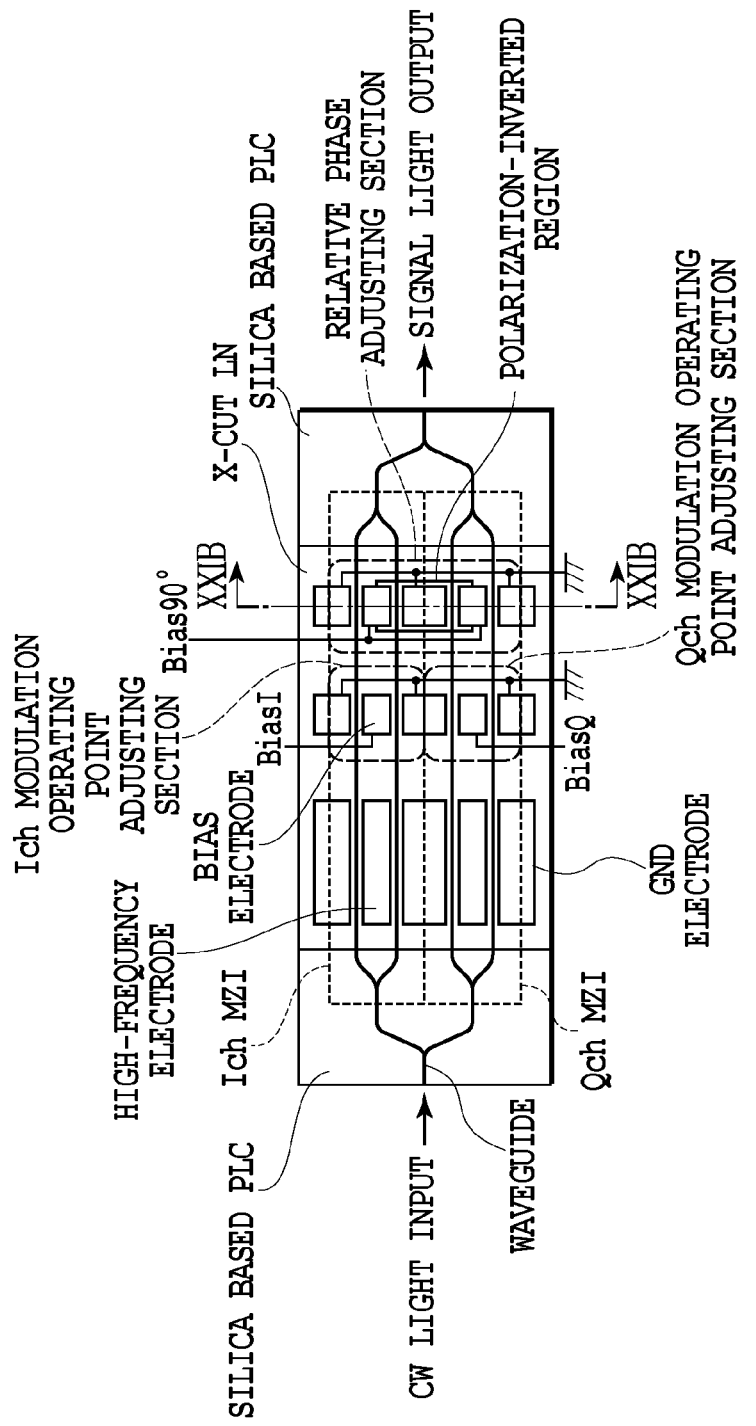
FIG. 21A illustrates the configuration of the embodiment 1a of the QPSK modulator using a polarization-inverted substrate.
Figure 21B:
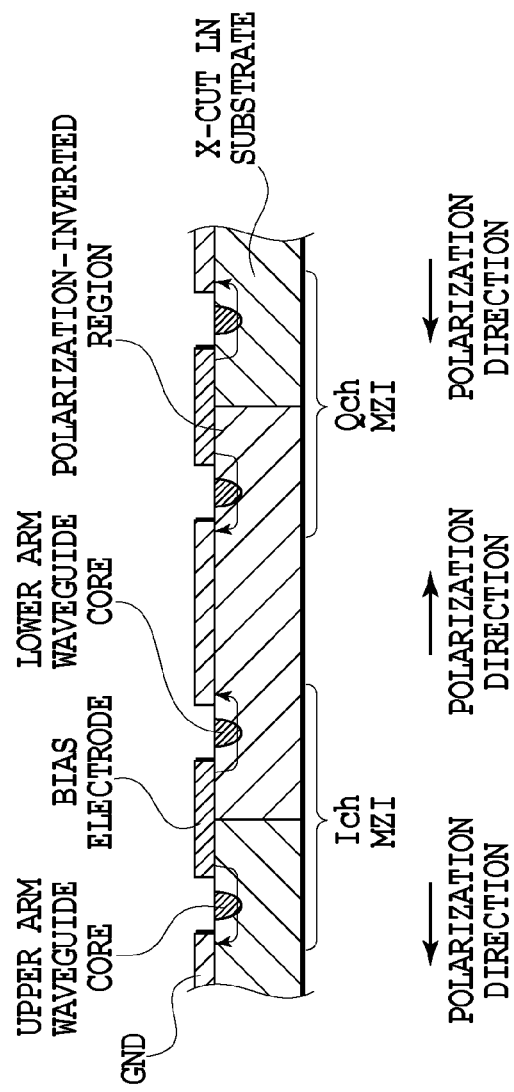
FIG. 21B is a cross-sectional view taken along the line XXIB-XXIB of FIG. 21A.

FIG. 21A illustrates an example in which the configuration of the embodiment 1a of the nest MZI modulator using the polarization-inverted substrate. In this configuration, the electrode layout configuration is different from the configuration of the embodiment 1a in that the modulation operating point adjusting section and the relative phase adjusting section have the same configuration and a part of the relative phase adjusting section uses a polarization-inverted substrate. This configuration provides the operation completely the same as that of the embodiment 1a because the child MZI modulator includes therein the bias electrode Bias90° in which an electric field in the same direction to the polarization direction in both of the upper and lower arms.

This configuration must use a polarization-inverted substrate. However, when this configuration is compared with the embodiment 1a, the number of bias electrodes is reduced, thus providing an advantage where the electrode layout is performed more simply.

In this example, the modulator of the embodiment 1a has been described as an example. However, the polarization-inverted structure also can be applied to other embodiments and the case where a Z-cut substrate is used.

Ninth Embodiment

The configuration of the modulator of the present invention has been described by an example of the configuration of a combination of composite material. However, when a single material-based modulator is desirably configured so that parts receiving the action by an EO effect are integrated as in the phase modulation array waveguide (i.e., when the parts receiving the action by an EO effect are desirably integrated only in the MZI modulator), the hybrid integrated-type configuration can be effectively substituted with the configuration of the present invention.

Figure 22A:
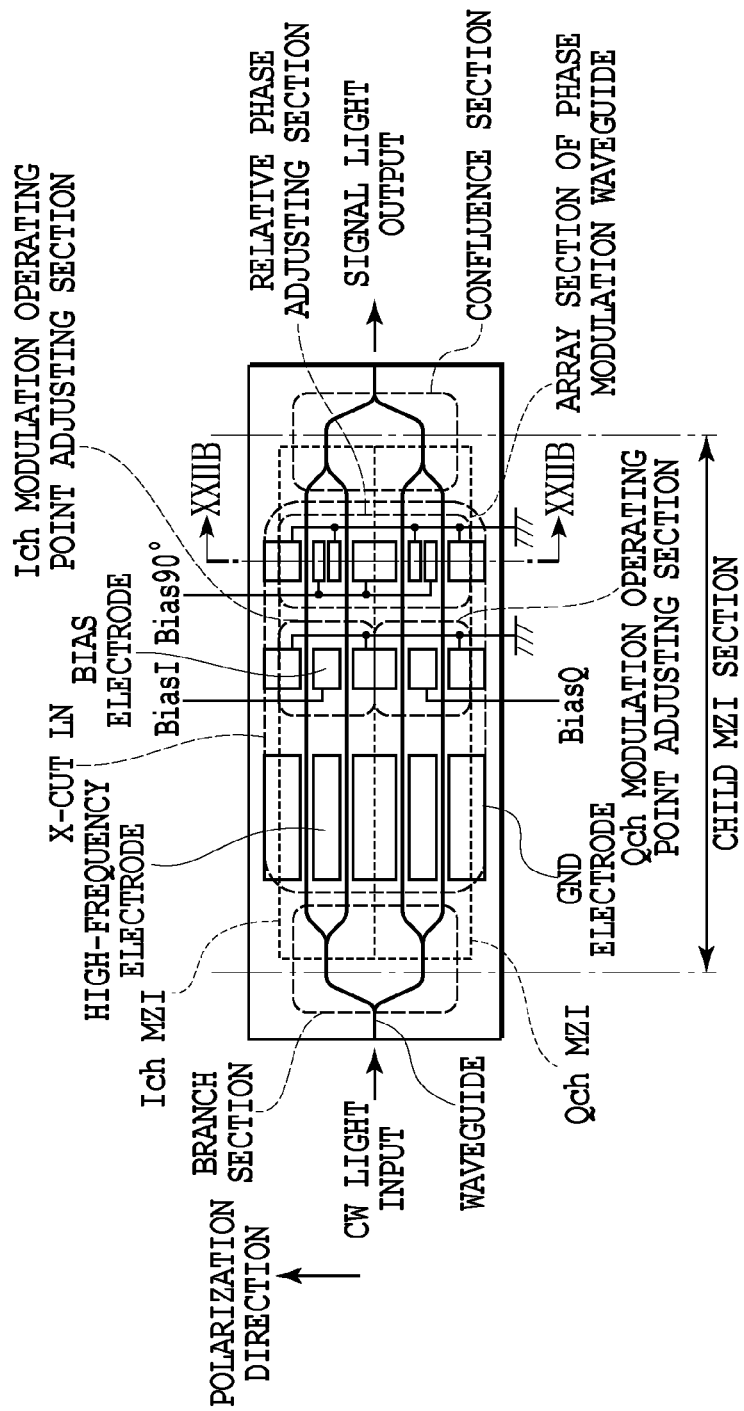
FIG. 22A illustrates the configuration of the embodiment 1a of the QPSK modulator using an LN monolithic substrate.
Figure 22B:
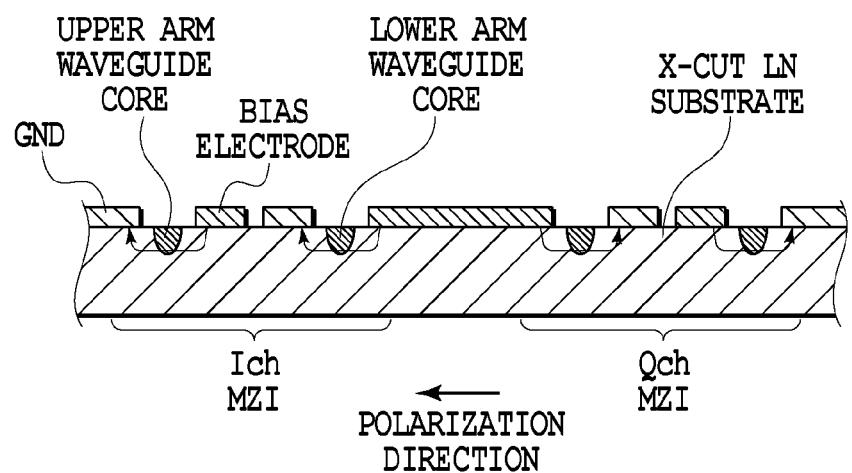
FIG. 22B is a cross-sectional view taken along the line XXIIB-XXIIB of FIG. 22A.

FIG. 22A illustrates the configuration of the embodiment 1a of the nest MZI modulator when an LN monolithic substrate is used. A branch part and a confluence part prepared on the PLC in the embodiment 1a are prepared on an LN substrate in this configuration. If it is not desired to place a phase shifter on the branch part/confluence part due to some reason, the concept of the invention of this application can be applied to integrate, as in this configuration, all of the phase shifters in the phase modulation waveguide array section.

Furthermore, the invention of this application also can be applied to the case where not all of the light circuits are prepared by an LN monolithic substrate and only the child MZI region of FIG. 22A for example is prepared by an LN substrate and the other outer parts are prepared by a PLC substrate or the case where all of the phase shifters are desired to be integrated in the phase modulation waveguide array section due to some reason.

The invention claimed is:

1. An optical modulator comprising:
    a parent Mach-Zehnder interferometer (MZI) comprising a plurality of arms; and
    one or more child MZIs, each child MZI being nested in a different one of the plurality of arms of the parent MZI, each child MZI comprising:
        first and second arms through which first and second bifurcated portions of an optical signal propagate;
        a first phase shifter that adjusts a modulation operating point of the optical signal by changing phases of the first and second portions of the optical signal in opposite directions with respect to each other as the first and second portions propagate through the first and second arms;
        a second phase shifter that adjusts a relative phase of the optical signal by changing phases of the first and second portions of the optical signal in a same direction with respect to each other as the first and second portions propagate through the first and second arms; and
        a third phase shifter that modulates the optical signal at high frequencies by changing phases of the first and second portions of the optical signal in an opposite direction with respect to each other by a high speed electric signal as the first and second portions propagate through the first and second arms;
    wherein the first phase shifter, the second phase shifter, and the third phase shifter are arranged on a substrate of a material having an electro-optic effect, and
    wherein a light path of a passive circuit part of the optical modulator is configured by dielectric material.

2. The optical modulator according to claim 1, wherein the first phase shifter and the second phase shifter are combined into a same phase shifter.

3. An optical modulator comprising:
    a parent Mach-Zehnder interferometer (MZI) comprising a plurality of arms; and
    one or more child MZIs, each child MZI being nested in a different one of the plurality of arms of the parent MZI, each child MZI comprising:
        first and second arm waveguides through which first and second bifurcated portions of an optical signal propagate;
        a first group of electrodes positioned in a vicinity of the first and second arm waveguides, the first group of electrodes being configured to adjust a modulation operating point of the optical signal by changing phases of the first and second portions of the optical signal in opposite directions with respect to each other as the first and second portions propagate through the first and second arm waveguides;
        a second group of electrodes positioned in a vicinity of the first and second arm waveguides, the second group of electrodes being configured to adjust a relative phase of the optical signal by changing phases of the first and second portions of the optical signal in a same direction with respect to each other as the first and second portions propagate through the first and second arm waveguides; and
        a third group of high-frequency electrodes positioned in a vicinity of the first and second arm waveguides, the group of high-frequency electrodes being configured to modulate the optical signal by changing phases of the first and second portions of the optical signal in an opposite direction with respect to each other by a high speed electric signal as the first and second portions propagate through the first and second arm waveguides;
    wherein the first group of electrodes, the second group of electrodes, and the third group of high-frequency electrodes are arranged on a substrate of a material having an electro-optic effect, and
    wherein a light path of a passive circuit part of the optical modulator is configured by dielectric material.

4. The optical modulator according to claim 3 wherein the first group of electrodes and the second group of electrodes are combined into a same group of electrodes.

* * * * *